(12) United States Patent
Bellamkonda et al.

(10) Patent No.: US 11,304,074 B1
(45) Date of Patent: Apr. 12, 2022

(54) SYSTEMS AND METHODS FOR ORCHESTRATION AND OPTIMIZATION OF WIRELESS NETWORKS

(71) Applicant: Verizon Patent and Licensing Inc., Basking Ridge, NJ (US)

(72) Inventors: Krishna K. Bellamkonda, Flower Mound, TX (US); Nischal Patel, Hillsborough, NJ (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/107,502

(22) Filed: Nov. 30, 2020

(51) Int. Cl.
*H04W 88/06* (2009.01)
*H04W 24/02* (2009.01)
*H04W 16/28* (2009.01)
*H04W 48/18* (2009.01)
*H04W 36/14* (2009.01)

(52) U.S. Cl.
CPC .......... *H04W 24/02* (2013.01); *H04W 16/28* (2013.01); *H04W 36/14* (2013.01); *H04W 48/18* (2013.01); *H04W 88/06* (2013.01)

(58) Field of Classification Search
CPC ..... H04W 24/02; H04W 16/28; H04W 36/14; H04W 48/18; H04W 88/06
See application file for complete search history.

(56) References Cited

U.S. PATENT DOCUMENTS

| | | | | |
|---|---|---|---|---|
| 9,743,237 | B2* | 8/2017 | Lee | H04W 4/023 |
| 10,810,491 | B1* | 10/2020 | Xia | G06N 3/08 |
| 2006/0239202 | A1* | 10/2006 | Kyperountas | H04B 17/391 370/252 |
| 2016/0088636 | A1* | 3/2016 | Zhao | H04W 72/082 455/454 |
| 2019/0389057 | A1* | 12/2019 | Chae | B25J 9/161 |
| 2021/0051544 | A1* | 2/2021 | Lee | H04W 24/08 |
| 2021/0195457 | A1* | 6/2021 | Kim | H04L 5/0023 |
| 2021/0226682 | A1* | 7/2021 | Park | H04B 7/0632 |
| 2021/0306887 | A1* | 9/2021 | Kim | H04W 68/00 |

* cited by examiner

*Primary Examiner* — Julio R Perez

(57) ABSTRACT

A system described herein may provide for the use of artificial intelligence/machine learning ("AI/ML") techniques to generate models for various locations or regions (e.g., sectors) associated with one or more radio access networks ("RANs") of a wireless network. The system may determine Key Performance Indicators ("KPIs") or other attributes that are of particular relevance or importance for a given sector model, and may determine actions to perform with respect to particular sectors in order to enhance performance according to the KPIs that are of particular relevance to a sector model determined with respect to the particular sectors.

20 Claims, 14 Drawing Sheets

SYSTEMS AND METHODS FOR ORCHESTRATION AND OPTIMIZATION OF WIRELESS NETWORKS

BACKGROUND

Wireless networks, such as Long-Term Evolution ("LTE") networks, Fifth Generation ("5G") networks, or the like, may include radio access networks ("RANs"), via which user equipment ("UE"), such as mobile telephones or other wireless communication devices, may receive wireless service. RANs, and/or portions of RANs, may have different characteristics and/or may exhibit different performance metrics (e.g., latency, throughput, etc.).

DETAILED DESCRIPTION OF EXAMPLE EMBODIMENTS

Figure 1:
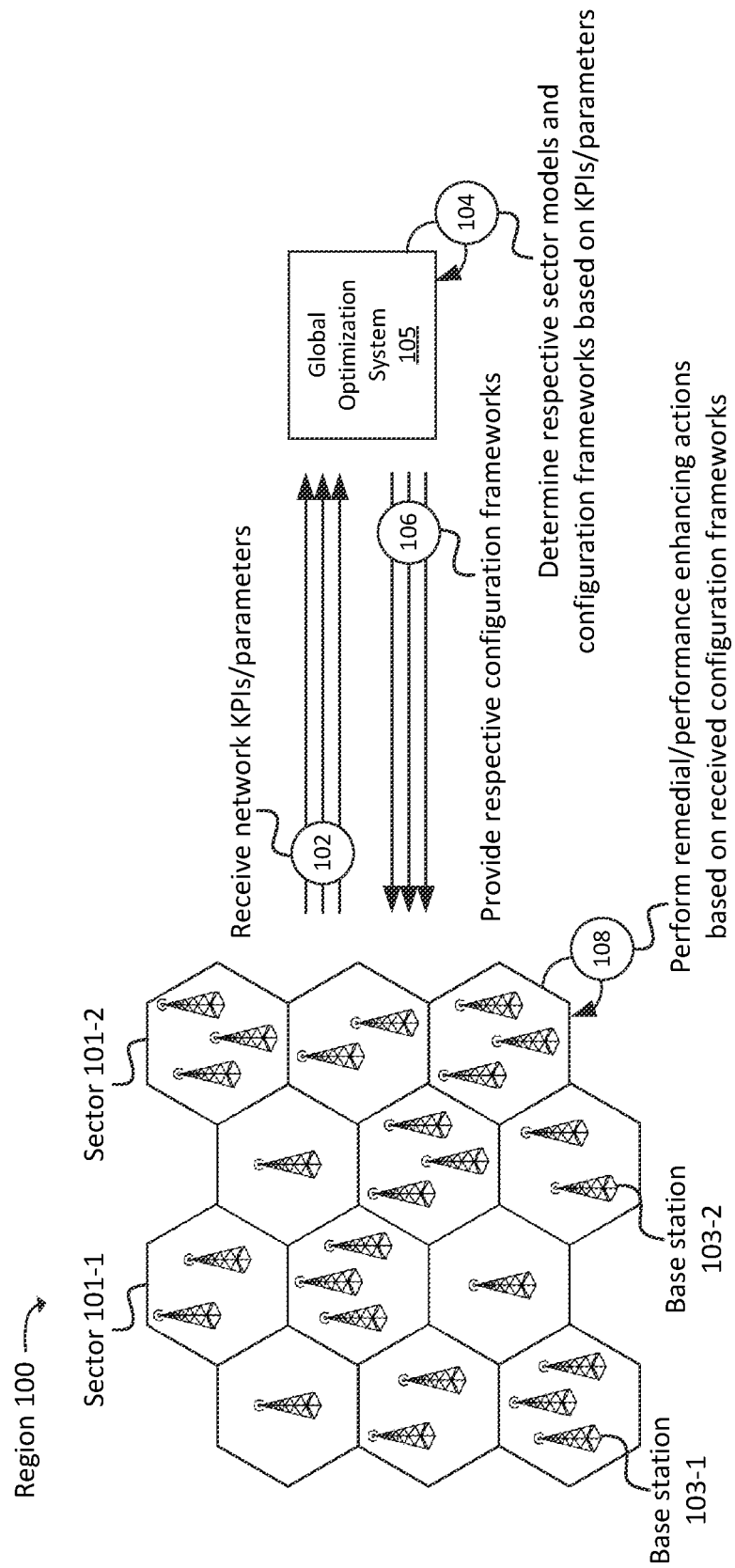
FIG. 1 illustrates an example overview of one or more embodiments described herein, in which a Global Optimization System ("GOS") may determine a sector model, configuration framework, and/or set of actions to perform with respect to a given sector associated with a RAN of a wireless network.

The following detailed description refers to the accompanying drawings. The same reference numbers in different drawings may identify the same or similar elements.

Embodiments described herein provide for the use of artificial intelligence/machine learning ("AI/ML") techniques or other suitable techniques to model attributes, characteristics, key performance indicators ("KPIs"), and/or other information associated with various locations or regions associated with one or more RANs of a wireless network (e.g., a LTE network, a 5G network, and/or another type of network). As discussed herein, such locations or regions may be referred to as "sectors." Further, in the examples discussed herein, sectors may include evenly distributed areas of a uniform shape (e.g., a hexagon). In practice, sectors may be arranged or defined differently. For example, in some embodiments, sectors may be defined with respect to the location of one or more base stations of a RAN (e.g., where a sector may be defined based on a coverage area of the one or more base stations and/or may be defined based on a physical location at which one or more antennas or other physical equipment of the base stations are installed), and/or may be defined independently of the location of the one or more base stations.

As described herein, one or more scores, metrics, etc. (referred to herein simply as "scores" for the sake of brevity) may be determined (e.g., using AI/ML techniques and/or other suitable techniques) based on service coverage (e.g., range or area of wireless service), service quality (e.g., Signal-to-Interference-and-Noise-Ratio ("SINR"), Channel Quality Indicator ("CQI"), latency, throughput, etc.), energy consumption metrics (e.g., measure of energy consumed over time), mobility metrics (e.g., quantity or proportion of UEs involved in a handover process), and/or other suitable metrics or information associated with base stations or other equipment associated with the RANs. In some embodiments, the scores may reflect an overall optimization score, which may reflect a holistic measure of how well a given sector is optimized.

As described herein, different sectors may be associated with different attributes, characterizations, categories, clusters, or the like. Embodiments herein may, for example, categorize a given sector as being associated with one or more sector models, where a sector model includes attributes, characteristics, etc. that may be compared to a given sector to determine whether the sector model applies to the sector. Further, particular sector models may be associated with configuration frameworks, which may specify weights and/or other information that may be used to generate an overall optimization score for a sector. For example, one particular configuration framework may weight energy savings metrics relatively heavily, while another configuration framework may weight energy savings metrics relatively lower than other types of metrics (e.g., coverage, quality, mobility, and/or other metrics).

Further, as described herein, particular configuration frameworks may be associated with particular sets of configuration parameters, attributes, and/or actions, which may be used by particular sectors in order to optimize the operation of the sectors in accordance with optimization goals that are reflected by the weights in the configuration frameworks. As described herein, the association between particular sector attributes, sector models, configuration frameworks, and/or associated actions may be generated and/or refined using one or more AI/ML techniques or other suitable techniques (e.g., deep learning, reinforced or unreinforced machine learning, neural networks, K-means clustering, regression analysis, and/or other suitable techniques).

As shown in FIG. 1, for example, geographical area (or region) 100 may be subdivided into a set of sectors 101. The set of sectors 101 may include, as shown, sector 101-1, 101-2, and one or more additional sectors that are not explicitly illustrated with a reference numeral.

Further in this example, each sector 101 may be associated with particular base stations 103. For example, base station 103-1 may be located in one particular sector 101, while base station 103-2 may be located in another sector 101. Further, additional base stations 103 (e.g., base stations not explicitly illustrated with a reference numeral) may be present in geographical region 100. That is, the location of each base station 103 may be within a particular geographical area (e.g., a hexagonal-shaped geographical area, in this example) that corresponds to a respective sector 101. For the sake of example, each sector 101 is associated with at least one base station 103. In practice, one or more sectors 101 may not include any base stations 103.

As shown, Global Optimization System ("GOS") 105 may receive (at 102) network KPIs and/or parameters associated with one or more sectors 101. For example, Global Optimization System 105 may communicate with base stations 103 of sectors 101 and/or UEs located within such sectors 101 via an application programming interface ("API"), an X2 interface, and/or some other suitable communication pathway, in order to receive such information. For example, base stations 103 and/or UEs communicatively coupled to respective base stations 103 may "push" such information to Global Optimization System 105 (e.g., via the API) on a periodic or intermittent basis, upon the occurrence of trigger events (e.g., one or more Quality of Service ("QoS") metrics exceeding a threshold value, a connection or disconnection of one or more UEs to one or more base stations 103, and/or other events), and/or on some other basis. In some embodiments, Global Optimization System 105 may "pull" (e.g., request or otherwise obtain) such information from the UEs, base stations 103, and/or other device or system that receives, collects, maintains, and/or provides such information. For example, Global Optimization System 105 may be communicatively coupled to a Service Capability Exposure Function ("SCEF") of a core network associated with base stations 103, a Network Exposure Function ("NEF"), and/or other suitable device, system, function, etc.

The received KPIs and/or parameters may include, for example, KPIs related to coverage, quality, energy consumption, mobility, and/or other suitable KPIs. Further, the received parameters may include, for example, configuration parameters, inter-sector information, locale features, and/or other suitable information indicating parameters and/or characteristics of a given sector 101. More detailed examples of KPIs and/or parameters are described below.

As further shown, GOS 105 may determine (at 104) one or more sector models associated with respective sectors 101 based on the received KPIs and/or parameters. For example, as discussed below, GOS 105 may use AI/ML techniques or other suitable techniques to identify one or more sector models that includes KPIs and/or attributes that are similar to the KPIs and/or attributes (received at 102) associated with respective sectors 101. For example, when determining whether KPIs and/or attributes of a given sector model is "similar" to KPIs and/or attributes of a given sector 101, GOS 105 may generate one or more scores, classifiers, or the like, and/or may perform a suitable similarity analysis to determine a measure of similarity between KPIs and/or attributes of a set of sector models and KPIs and/or attributes of a given sector 101. In some embodiments, GOS 105 may select a particular sector model if the measure of similarity exceeds a threshold measure of similarity. Additionally, or alternatively, GOS 105 may select a particular quantity of highest-scoring sector models (e.g., the highest scoring sector mode, the top three scoring sector models, etc.). In some embodiments, GOS 105 may select a particular quantity of highest-scoring sector models, so long as the scores associated with such sector models exceeds a threshold score (e.g., the top three scoring sector models so long as the top three scoring sector models exceed the threshold score, the top two scoring sector models if the third highest-scoring sector model is below the threshold score, etc.).

As further discussed in more detail below, GOS 105 may further determine (at 104) one or more configuration frameworks for one or more sectors 101 based on the sector models identified with respect to respective sectors 101. For example, as discussed below, particular sector models may be associated with particular configuration frameworks. In some embodiments, a given sector model may be associated with an affinity score for multiple configuration frameworks, where the affinity score indicates a measure of affinity, correlation, effectiveness, applicability, or the like of a given configuration framework to a given sector model. For example, the same configuration framework may be particularly applicable to one particular sector model (e.g., associated with a relatively high affinity score with respect to the particular sector model), while the same configuration framework may be less applicable to a different sector model (e.g., associated with a relatively low affinity score with respect to the other sector model). In some embodiments, GOS 105 may generate a configuration framework based on using AI/ML techniques or other suitable techniques to analyze the sector models, KPIs, and/or parameters associated with sector 101, as well as analyzing previously generated configuration frameworks, to determine weights and/or other parameters of a configuration framework that is applicable to the particular sector 101.

In some embodiments, GOS 105 may receive (at 102) KPIs and/or parameters over time, and may select (at 104) different sector models and/or configuration frameworks based on different KPIs and/or parameters received at different times and/or time periods. As one example, a particular sector 101 may exhibit a first set of KPIs and/or parameters (e.g., latency, throughput, quantity of connected UEs, and/or other KPIs or parameter) at times corresponding to a morning or afternoon weekday commute, and may exhibit a second set of KPIs and/or parameters at times corresponding to an evening or weekend. In this example, GOS 105 may determine (at 104) a first sector model (or set of sector models) and one or more associated configuration frameworks during morning or afternoon hours on weekdays, and may determine a second sector model (or set of sector models) and one or more associated configuration frameworks during evening hours and/or weekends.

GOS 105 may further output (at 106) information indicating the identified configuration frameworks to respective sectors 101. For example, GOS 105 may provide the information to respective base stations 103 associated with sectors 101, to a management device or system associated with one or more sectors 101, and/or some other device or system. Additionally, or alternatively, GOS 105 may provide (at 106) information indicating one or more actions associated with the identified configuration frameworks. For example, in some embodiments, GOS 105 may determine, based on the sector model(s), KPIs, and/or parameters associated with a respective sector 101, and further based on the identified configuration framework(s) selected for sector 101, one or more actions to take to increase the overall optimization score associated with sector 101. Additionally, or alternatively, each sector 101 may determine particular actions to take based on the received configuration framework information. As noted above, such actions may be selected and performed by network devices located in or serving sector 101 in order to increase the overall optimization score associated with sector 101. For the sake of brevity, the performance of a given action by a network device located in or serving sector 101 will be referred to herein as sector 101 performing the action.

Such actions may include, for example, modifying QoS-related parameters, such as modifying queue weights associated with the processing, transmitting, or otherwise handling traffic associated with particular QoS values, such as QoS Class Identifier ("QCI") values, QoS Flow Identifier ("QFI") values, priority values, and/or other suitable values or indicators.

In some embodiments, such actions may include modifying the availability or allocation of physical RAN resources, such as Physical Resource Blocks ("PRBs"), portions of radio frequency ("RF") spectrum, or the like. In some embodiments, such modification may be on the basis of an identifier associated with a given UE, such as an International Mobile Subscriber Identity ("IMSI"), International Mobile Station Equipment Identity ("IMEI"), Globally Unique Temporary Identifier ("GUTI"), Subscription Permanent Identifier ("SUPI"), Internet Protocol ("IP") address, Mobile Directory Number ("MDN"), or other suitable identifier. For example, a particular UE or set of UEs, such as UEs associated with first responders, government agencies, or some other suitable category, may be granted a larger allocation of available RF resources than other UEs.

In some embodiments, such actions may include implementing one or more energy-saving techniques, such as activating a cell suspend mode, modifying antenna transmission and/or reception parameters in the time and/or frequency domains, throttling one or more processors, entering a low-power mode, and/or otherwise reducing the amount of power (e.g., electrical power) consumed by one or more devices or systems that implement or are otherwise associated with sector 101.

In some embodiments, such actions may include modifying one or more beamforming parameters associated with sector 101. For example, sector 101 may modify azimuth angle, tilt angle, beam width, antenna power, and/or other aspects of beamforming parameters associated with one or more antennas of sector 101. In some embodiments, sector 101 may modify a Multiple-Input Multiple-Output ("MIMO") configuration associated with sector 101, such as activating or deactivating a MIMO mode, selecting one or more antennas to implement MIMO a given MIMO configuration, or other MIMO parameters associated with sector 101.

In some embodiments, such actions may include modifying parameters related to handovers and/or mobility. For example, sector 101 may modify a Neighbor Cell List ("NCL") provided to UEs connected to a particular base station of sector 101, which may affect how such UEs scan for or detect neighboring base stations. In some embodiments, such actions may include modifying handover-related parameters, such as handover thresholds used by UEs to determine whether such UEs should request a handover from base station to another base station. Such handover thresholds may refer to, for example, threshold measures of signal strength or quality, such as a Received Signal Strength Indicator ("RSSI") value, a CQI value, a Signal-to-Interference-and-Noise-Ratio ("SINR") value, a Reference Signal Receive Power ("RSRP") value, and/or some other suitable value.

While example actions are described above, in practice, other suitable actions may be performed in order to optimize the operation of sectors 101 (e.g., based on configuration frameworks identified with respect to sectors 101). In some embodiments, performing such actions may include performing multiple actions, such as multiple actions performed above. Such performance may be simultaneous, sequential, or on some other basis.

Respective sectors 101 may perform (at 108) the actions associated with respective configuration frameworks, and GOS 105 may continue to receive (at 102) up-to-date KPIs associated with sectors 101. GOS 105 may, based on continuing to receive the up-to-date KPIs, modify the determination of sector models associated with a particular sector 101, and/or may update an overall optimization score associated with the particular sector 101. In some embodiments, GOS 105 may select a new set of actions and/or a different configuration framework for sector 101 based on the up-to-date KPIs. In some embodiments, GOS 105 may modify one or more sector models, configuration frameworks, and/or other information based on whether the performed (at 108) actions increased the overall optimization score associated with sector 101, and/or based on how much the overall optimization score associated with sector 101 was modified based on the performance of the actions.

In some embodiments, while described in the context of being performed by GOS 105, in some embodiments, one or more devices or systems associated with sectors 101 may perform one or more of the operations described above in lieu of, or in addition to, GOS 105. For example, in some embodiments, one or more devices or systems of sector 101 may identify a particular action based on a given configuration framework and/or sector model, and/or based on continuing to monitor KPIs associated with sector 101 after performing (at 108) a particular action or set of actions.

Figure 2:
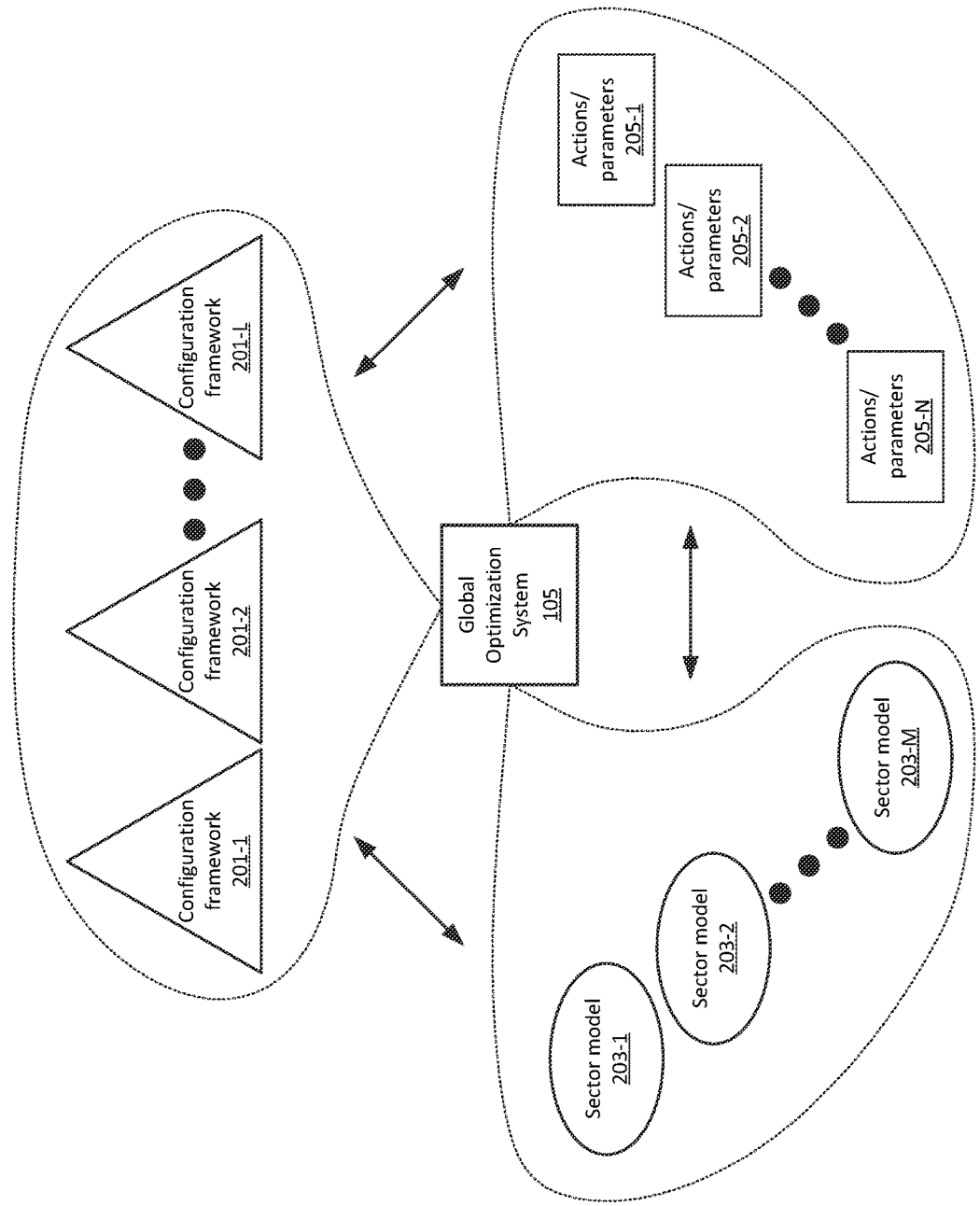
FIG. 2 illustrates example configuration frameworks, sector models, and/or actions/parameters that may be generated, received, maintained, provided, etc. by a GOS of some embodiments.

FIG. 2 illustrates example configuration frameworks, sector models, and/or actions/parameters that may be generated, received, maintained, provided, etc. by GOS 105. For example, GOS 105 may be associated with a set of configuration frameworks 201, such as example configuration frameworks 201-1, 201-2, and 201-L. Further, GOS 105 may be associated with a set of sector models 203, such as example sector models 203-1, 203-2, and 203-M. Additionally, GOS 105 may be associated with a set of actions/parameters 205, such as example actions/parameters 205-1, 205-2, and 205-N.

GOS 105 may generate and/or modify configuration frameworks 201, sector models 203, and/or actions/parameters 205 based on AI/ML techniques or other suitable techniques. For example, GOS 105 may generate, modify, refine, etc. configuration frameworks 201, sector models 203, and/or actions/parameters 205 based on an evaluation of real-world data from sectors 101 and/or simulations of KPIs in a simulation and/or test environment. GOS 105 may further determine or identify correlations between respective configuration frameworks 201, sector models 203, and/or actions/parameters 205 using AI/ML techniques or other suitable techniques.

Figure 3:
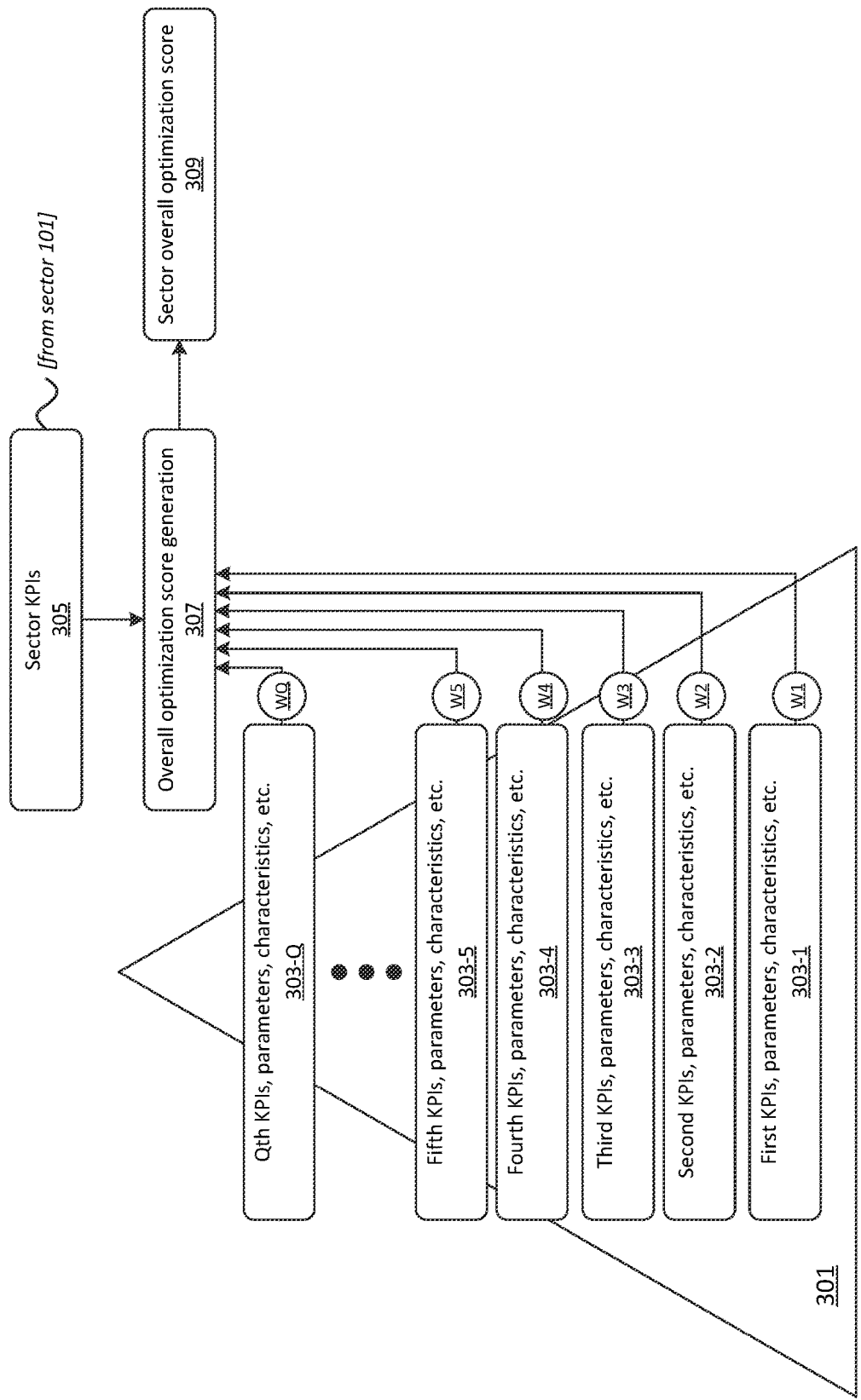
FIGS. 3, 4A, and 4B illustrate examples of respective configuration frameworks in accordance with some embodiments.
Figure 4A:
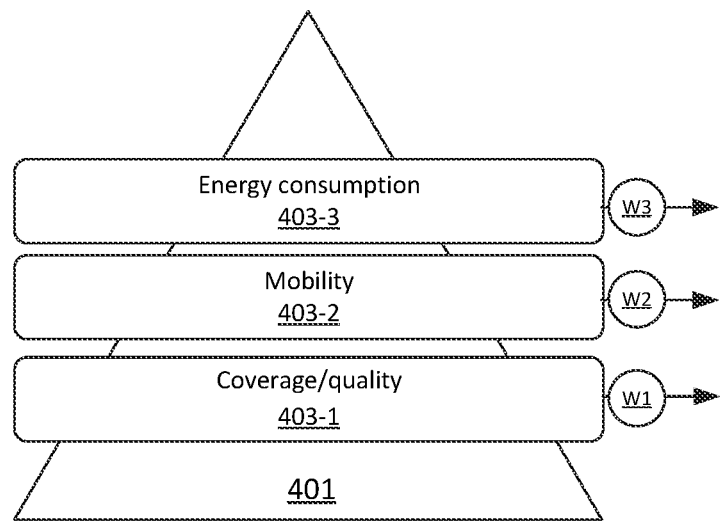
Figure 4B:
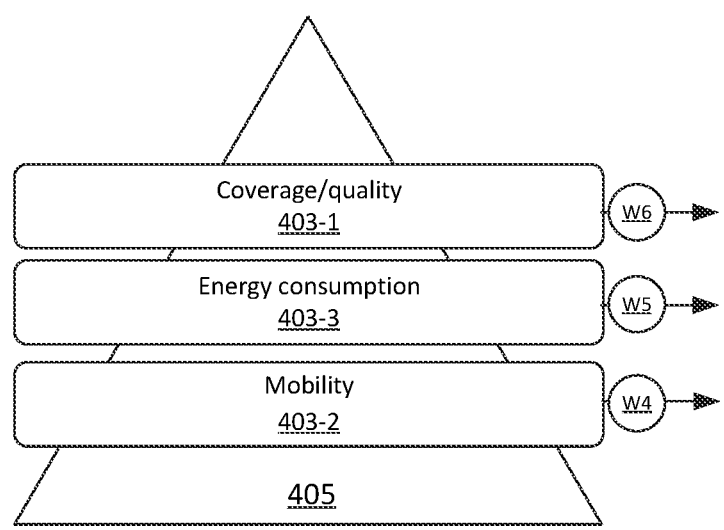
Figure 5:
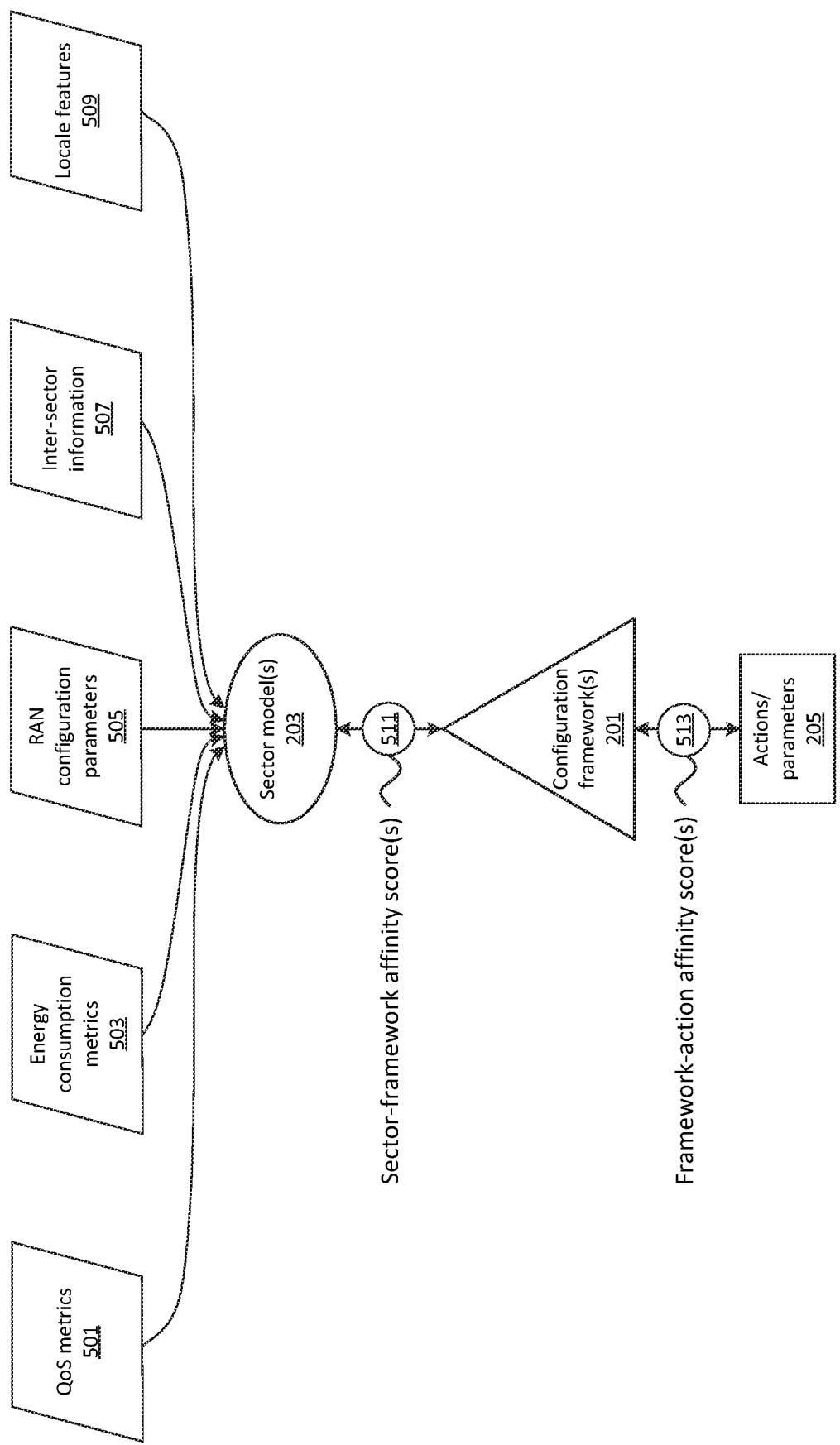
FIG. 5 illustrates example attributes associated with a particular sector model, and further illustrates an example associations between the sector model, configuration framework, and actions and/or parameters, in accordance with some embodiments.

FIGS. 3, 4A, and 4B, discussed below, illustrate examples of respective configuration frameworks 201. FIG. 5, also discussed below, illustrates example attributes associated with a particular sector model 203, and further illustrates an example association between sector model 203, configuration framework 201, and/or actions/parameters 205.

As shown in FIG. 3, for example, configuration framework 301 may include a set of KPIs, parameters, characteristics, etc. 303 (e.g., KPIs, parameters, characteristics, etc. 303-1 through 303-Q). KPIs, parameters, characteristics, etc. 303 may include any suitable type of KPIs, parameters, characteristics, etc. 303 relating to actions to be performed in a network environment, in order to optimize considerations relating to KPIs, parameters, characteristics, etc. 303 in a manner similar to that described above. For the sake of brevity, sets of KPIs, parameters, characteristics, etc. 303 are sometimes referred to herein as "KPI categories 303."

In some embodiments, each KPI category 303 of configuration framework 301 may specify one or more KPIs, such as latency, throughput, jitter, quantity of active connections, quantity and/or proportion of dropped calls, energy consumption metrics, quantity or proportion of handovers into and/or out of a sector, durations of connections of UEs to base stations located in a sector, location information of UEs connected to a base station of a sector, and/or other suitable metrics. In some embodiments, each respective KPI category 303 may specify conditions, thresholds, or the like, based on which a given KPI category 303 may be applicable to a particular KPI or set of KPIs associated with a given sector. For example, KPI category 303-1 and KPI category 303-2 may both be associated with different value ranges for the same KPI. For example, KPI category 303-1 may be applicable to latency metrics if such latency metrics indicate a value of 100 milliseconds ("ms") or lower, and KPI category 303-2 may be applicable to latency values of greater than 100 ms.

In some embodiments, KPI categories 303 may include thresholds based on which maximum and/or minimum scores may be determined. For example, assume that KPI category 303-1 is applicable to a latency metric. KPI category 303-1 may specify that latency values below a first threshold value, such as 30 ms, are associated with a maximum KPI score (e.g., 100 out of 100), may specify that latency values above a second threshold value (e.g., 300 ms) are associated with a minimum KPI score (e.g., 1 out of 100), etc. In this manner, certain KPIs may be prioritized by KPI category 303, without allowing such KPIs to dominate the overall optimization score for a given sector.

As further shown, each respective KPI category 303 may be associated with a score weight. For example, KPI category 303-1 may be associated with a first weight W1, KPI category 303-2 may be associated with a second weight W2, KPI category 303-3 may be associated with a third weight W3, and so on. As noted above, the different weights may be used to prioritize certain KPIs or sets of KPIs more heavily than others.

For example, assume that configuration framework 301 has been selected with respect to a given sector 101. Sector 101 may generate, determine, etc. a set of KPIs 305 over a given time period. Sector 101, GOS 105, and/or some other suitable device or system may perform an overall optimization score generation operation 307 with respect to sector 101 for the given time period, based on the set of KPIs 305 and the weights associated with respective KPIs. For example, assume that the set of KPIs 305 include latency metrics associated with sector 101 and energy consumption metrics associated with sector 101. Further assume that latency is a particular KPI identified in KPI category 303-1, and that energy consumption is a particular KPI identified in KPI category 303-2.

When generating (at 307) an overall optimization score for sector 101, a first KPI score may be generated based on the received latency metrics and a second KPI score may be generated based on the energy consumption metrics. In some embodiments, KPI score generation may be in a normalized manner (e.g., on a scale of 1-100 or some other suitable scale) for dissimilar or incongruous metrics. For example, a latency value of 10 ms may be associated with a KPI score of 92, and an energy consumption value of 10 kiloWatt-hours ("kWh") may be associated with a KPI score of 15. In some embodiments, particular KPI categories 303 may specify formulas, rubrics, rules, or the like based on which respective KPI scores may be generated based on raw KPI values. These KPI scores may be further modified based on the respective weights associated with KPI categories 303. For example, the first KPI score may be weighted according to weight W1, while the second KPI score may be weighted according to weight W2. In some embodiments, weighting the KPI scores may include multiplying the respective KPI scores by the weights in order to generated weighted KPI scores. In this manner, different KPIs or sets of KPIs may be factored or prioritized differently in the overall optimization score ultimately generated via overall optimization score operation 307.

Overall optimization score operation 307 may include aggregating, combining, and/or performing other suitable computations on weighted KPI scores to generate overall optimization score 309 for sector 101. As noted above, overall optimization score 309 may be generated and/or modified on an ongoing basis, as updated sector KPIs 305 are received or determined.

FIGS. 4A and 4B illustrate example configuration frameworks 401 and 405, in accordance with some embodiments. As shown in FIG. 4A, configuration framework 401 may include KPI categories such as KPI categories 403-1 through 403-3.

KPI category 403-1 may include, for example, KPIs related to coverage and/or quality, such as latency, throughput, jitter, SINR, CQI, RSSI, etc. In some embodiments, such KPIs may be specified as a function of location within a sector and/or distance from one or more base stations of a sector. For example, KPI category 403-1 may specify a first set of thresholds, values, formulas, etc. for calculating a KPI score relating to latency within 100 meters of a base station, and a second set of thresholds, values, formulas, etc. for calculating a KPI score relating to latency further than 100 meters from a base station.

KPI category 403-1 may, in some embodiments, include KPIs, metrics, parameters, etc. relating to RAN coverage within a given geographical area and/or sector 101. For example, KPI category 403-1 may relate to areas within sector 101 that receive wireless coverage from base stations or other wireless network infrastructure located within or otherwise serving sector 101. In some embodiments, KPI category 403-1 may include quality metrics as a function of distance or coverage (e.g., distance from a base station and/or other RF hardware), in that KPIs, metrics, etc. relating to signal quality may vary as a function of location (e.g., different levels or qualities of coverage may be available at different locations within sector 101). Such KPIs, metrics, etc. may include a RSRP value (e.g., a mean RSRP value over a given time period, a maximum RSRP value over a given time period, a minimum RSRP value over a given time period, etc.), a Reference Signal Received Quality ("RSRQ") (e.g., a mean RSRQ value over a given time period, a maximum RSRQ value over a given time period, a minimum RSRQ value over a given time period, etc.), a Channel Quality Indicator CQI value (e.g., a mean CQI value over a given time period, a maximum CQI value over a given time period, a minimum CQI value over a given time period, etc.), an uplink ("UL") power headroom value (e.g., a mean UL power headroom value over a given time period, a maximum UL power headroom value over a given time period, a minimum UL power headroom value over a given time period, etc.), an UL Physical Uplink Shared Channel ("PUSCH") Signal-to-Interference-and-Noise-Ratio ("SINR") value (e.g., a mean UL PUSCH value over a given time period, a maximum UL PUSCH value over a given time period, a minimum UL PUSCH value over a given time period, etc.), a UL Physical Uplink Control Channel ("PUCCH") value (e.g., a mean UL PUCCH value over a given time period, a maximum UL PUCCH value over a given time period, a minimum UL PUCCH value over a given time period, etc.), quantity or percentage of samples with a given transmission ("Tx") mode, MIMO utilization values, and/or other suitable KPIs, values, metrics, or the like. As noted above, such KPIs, values, metrics, or the like may be monitored, provided, etc. in a location-based manner. For example, performance KPIs associated with particular sectors 101 and/or sub-sectors (e.g., divided according to "bins" or categories based on distance and/or angle within a given sector 101) may be evaluated in accordance with one or more weights associated with KPI category 403-1.

KPI category 403-2 may relate to metrics relating to mobility, such as quantity or proportion of handovers of UEs into or out of a sector, durations of connections between UEs and base stations located in a sector, durations that UE location information indicated that UEs were located within a sector, or the like. In some embodiments, such information may include, for example, whether a given UE is moving within sector 101, moving between sectors, and/or is stationary. KPI category 403-2 may further include and/or may be based on trends, weights, constraints, predictions, etc. relating to mobility, such as whether a given UE is likely to enter, exit, traverse within, and/or remain stationary within sector 101. For example, such trends, weights, predictions, etc. may be generated, derived, calculated, computed, etc. based on one or more AI/ML techniques or other suitable techniques. Such techniques may include deep learning, reinforced or unreinforced machine learning, neural networks, K-means clustering, regression analysis, and/or other suitable techniques, analyses, computations, or the like. In some embodiments, KPI category 403-2 may include KPIs, metrics, values, etc. relating to a quantity of inter-RAT handovers occurring in a particular geographical area (e.g., sector 101) or with respect to a respective base station over a given time period, quantity of inter-cell type sessions over a given time period, quantity of co-sector transitions over a given time period, quantity of intra-frequency handovers over a given time period, quantity of inter-frequency handovers over a given time period, quantity of blind redirections over a given time period, and/or other suitable KPIs, metrics, and/or other information.

KPI category 403-3 may relate to metrics related to amounts or rates of energy consumption (e.g., electrical power usage) at one or more devices or systems of a given sector, such as rates of consumption (e.g., Watts, kiloWatts, etc.), amounts of consumption over time (e.g., Wh, kWh, etc.), and/or other metrics related to energy consumption.

Further, in the example of FIG. 4A, KPI category 403-1 may be associated with a first weight W1, KPI category 403-2 may be associated with a second weight W2, and KPI category 403-3 may be associated with a third weight W3. In the example configuration framework 405 of FIG. 4B, the same KPI categories 403-1, 403-2, and 403-3 may be specified, but with different weights than the example configuration framework 401 of FIG. 4A. For example, configuration framework 405 may specify that KPI category 403-2 is associated with a fourth weight W4, KPI category 403-3 is associated with a fifth weight W5, and KPI category 403-1 is associated with a sixth weight W6.

FIG. 5 illustrates example sector attributes, metrics, or the like that may be associated with particular sector models 203, as well as an example association between sector model 203, configuration framework 201, and/or actions/parameters 205. As shown, for example, example sector model 203 may include QoS metrics 501, energy consumption metrics 503, RAN configuration parameters 505, inter-sector information 507, locale features 509, and/or one or more other types of information.

As discussed above, QoS metrics 501 may reflect QoS metrics associated with a particular sector 101 over a particular period of time, and energy consumption metrics 503 may indicate an amount of energy consumed at the particular sector 101 over the particular period of time. RAN configuration parameters 505 may include parameters such as an indication of quantity and/or position (e.g., geographical position) of physical infrastructure hardware (e.g., antennas, radios, data centers, or the like) associated with one or more RANs in sector 101. In some embodiments, RAN configuration parameters 505 may indicate particular radio access technologies ("RATs") implemented in sector 101 (e.g., a LTE RAT, a 5G RAT, etc.), beam configurations implemented in sector 101 (e.g., beam quantity, beam azimuth angles, beam width, beam transmission power, etc.), MIMO configuration information, and/or other suitable information.

Inter-sector information 507 may include information associated with sectors adjacent to or proximate to a given sector 101. For example, inter-sector information 507 may include RAN parameters, QoS metrics, and/or energy consumption metrics, associated with sectors adjacent to or within a threshold distance of sector 101. In some embodiments, inter-sector information 507 may include mobility information, which may be associated with mobility of UEs between sector 101 and neighboring sectors. For example, inter-sector information 507 may indicate that UEs that are located in sector 101 are likely to be stationary within sector 101 for a first duration of time (e.g., approximately one hour), and then that such UEs travel to a particular neighboring sector. As another example, inter-sector information 507 may indicate that UEs that are located in the neighboring sector are relatively likely to enter the particular sector 101.

Locale features 509 may include information indicating attributes and/or features of the geographical area. For example, locale features 509 may include information relating to building layout and/or density, topographical features (e.g., mountains, valleys, forests, streams, etc.), weather-related information, air quality-related information (e.g., smog density, particulate density, fog density, etc.), and/or other factors that may affect energy consumption, QoS metrics, or other metrics. Locale features 509 may include geographical coordinates (e.g., latitude and longitude coordinates, Global Positioning System ("GPS") coordinates, or the like) or other suitable location information, to indicate the geographical locations of respective features.

As described below with respect to FIG. 6, a given sector 101 may be associated with one or more sector models 203 based on a comparison of the above-described factors, and/or one or more other factors, of sector 101 to such factors associated with a set of candidate sector models 203. Briefly, for example, GOS 105 may determine that a particular sector 101, that exhibits a particular set of QoS metrics 501, a particular set of energy consumption metrics 503, and a first set of locale features 509 (e.g., urban features such as high-rise buildings) is associated with a first sector model 203, while another sector 101, that exhibits a similar set of QoS metrics 501 and a similar set of energy consumption metrics 503, but a different second set of locale features 509 (e.g., rural features such as relatively flat areas with relatively low building density) is associated with a different second sector model 203. Generally, a given sector model 203 may describe or reflect parameters, metrics, attributes, etc. of a given sector 101.

As further shown, sector model 203 may be associated with one or more configuration frameworks 201. For example, GOS 105 may use AI/ML techniques or other suitable techniques to determine that particular KPIs, attributes, etc. are more important for sectors 101 with particular attributes than for sectors with different attributes. As an example, GOS 105 may determine that sectors 101 having a first set of attributes should have mobility-related parameters prioritized (e.g., KPI category 403-2) and that energy consumption-related parameters (e.g., KPI category 403-3) are less of a priority, and may determine that sectors 101 having a second set of attributes should have coverage/quality-related parameters prioritized (e.g., KPI category 403-1). In this example, GOS 105 may determine that the first sector 101 is associated with a first configuration framework 201 and that the second sector 101 is associated with a second configuration framework 201.

In some embodiments, additionally, or alternatively, GOS 105 may determine that the first and second sectors 101 are both associated with the first and second configuration frameworks 201, but with different sector-framework affinity scores 511. For example, the first sector 101 may have a relatively high sector-framework affinity score 511 with the first configuration framework 201 (e.g., based on the determination that configuration framework 201 prioritizes KPIs, metrics, or the like that are a priority for the first sector 101) and may have a relatively low sector-framework affinity score 511 with the second configuration framework 201. On the other hand, the second sector 101 may have a relatively low sector-framework affinity score 511 with the first configuration framework 201 and a relatively high sector-framework affinity score 511 with the second configuration framework 201.

GOS 105 may further generate, maintain, refine, etc. (e.g., using one or more AI/ML techniques or other suitable techniques) one or more associations between respective configuration frameworks 201 and one or more sets of actions/parameters 205. For example, each configuration framework 201 may be associated with one or more sets of actions/parameters 205, as each particular set of actions/parameters 205 may have been determined (e.g., based on real-world results and/or simulated results) as increasing an overall optimization score of one or more sectors 101 that match sector model 203, where such overall optimization score is computed based on configuration framework 201. As noted above, actions/parameters 205 may include modifying QoS parameters, modifying beamforming and/or other antenna parameters, modifying energy consumption parameters, modifying handover parameters, or other suitable actions.

GOS 105 may also determine framework-action affinity scores 513 between configuration framework 201 and respective sets of actions/parameters 205. As similarly discussed above, framework-action affinity scores 513 may generally indicate how effective a given set of actions/parameters 205 are for increasing an overall optimization score of a particular sector 101, given configuration framework 201 associated with sector 101. Thus, multiple sets of actions/parameters 205 may be associated with a respective configuration framework 201, and respective framework-action affinity scores 513 between configuration framework 201 and the sets of actions/parameters 205 may be used to ultimately determine which actions to take with respect to a given sector model 203.

While FIG. 5 provides examples of relationships between configuration frameworks 201, sector models 203, and actions/parameters 205, in practice, other arrangements or relationships are possible. For example, in some embodiments, one or more affinity scores may be generated, maintained, refined, etc. between sector models 203 and sets of actions/parameters 205. Such affinity scores between sector models 203 and actions/parameters 205 may be determined in addition to, or in lieu of, sector-framework affinity scores 511 and/or framework-action affinity scores 513. For example, the same configuration framework 201 may be applied to two different sector models 203 for two different sectors 101, and the resulting actions/parameters 205 may be different for the two different sectors 101.

Figure 6:
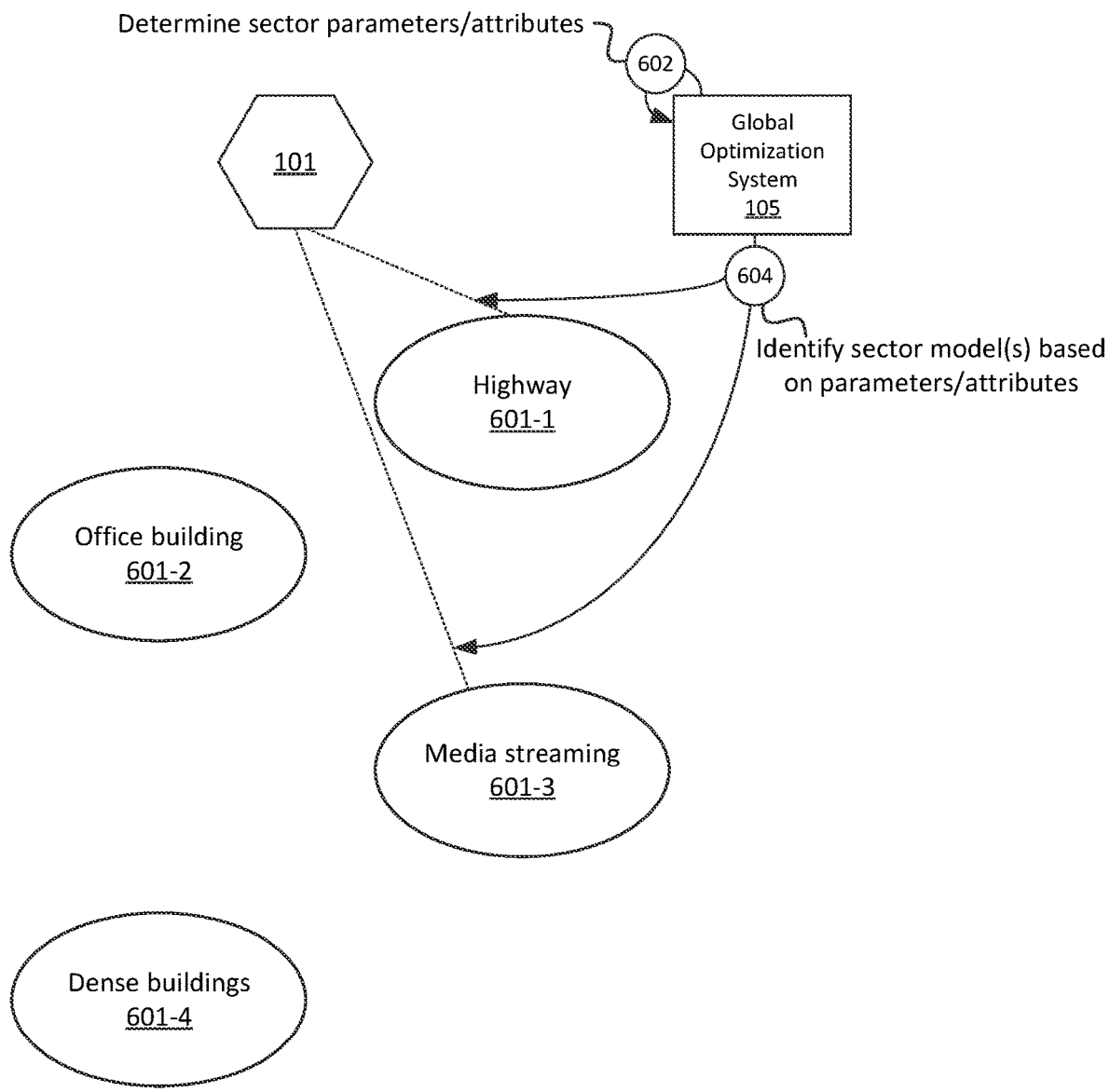
FIGS. 6-8 illustrate an example determination of one or more sector models, configuration frameworks, and/or sets of actions to perform with respect to a given sector associated with a RAN of a wireless network.
Figure 7A:
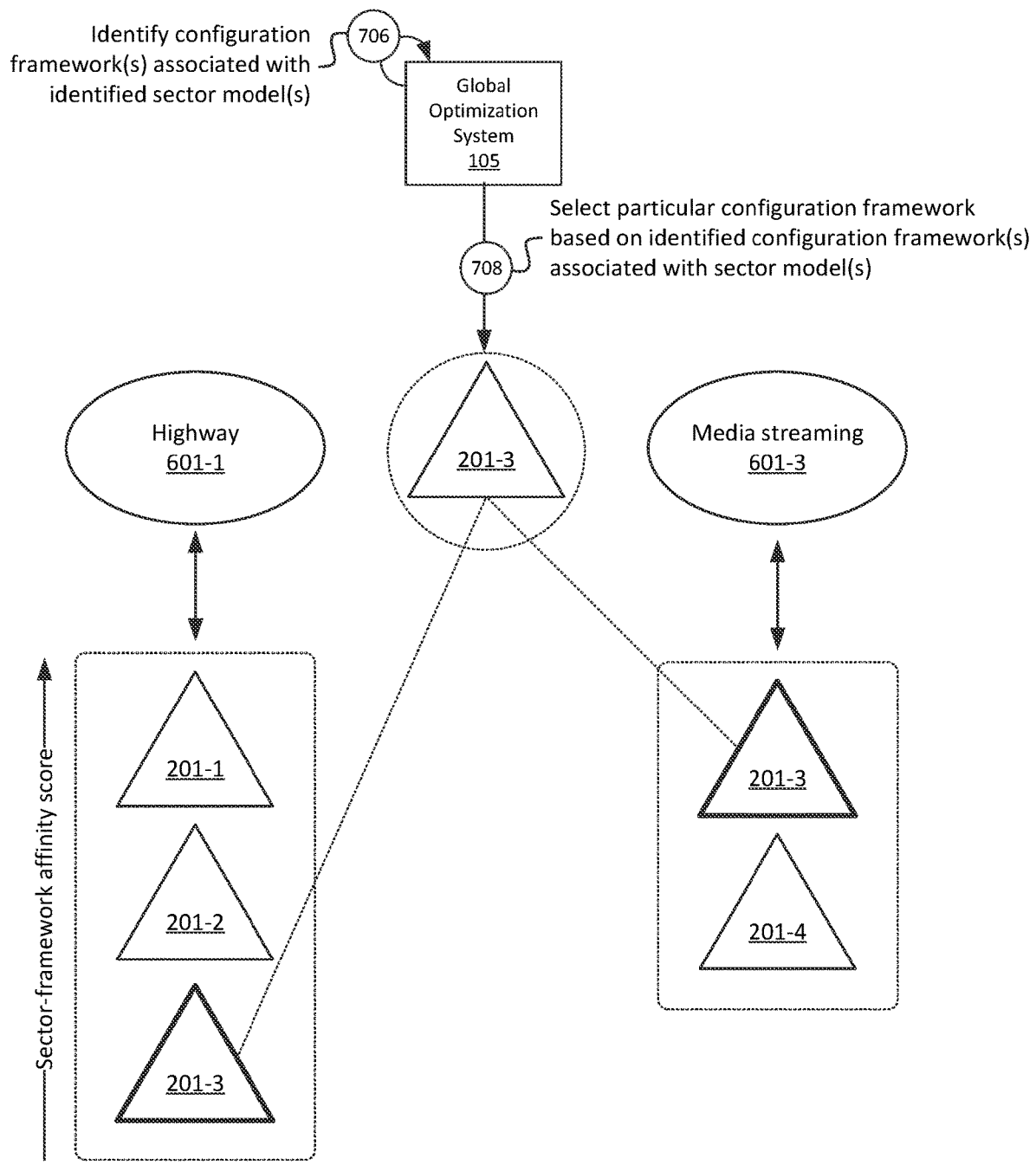
Figure 7B:
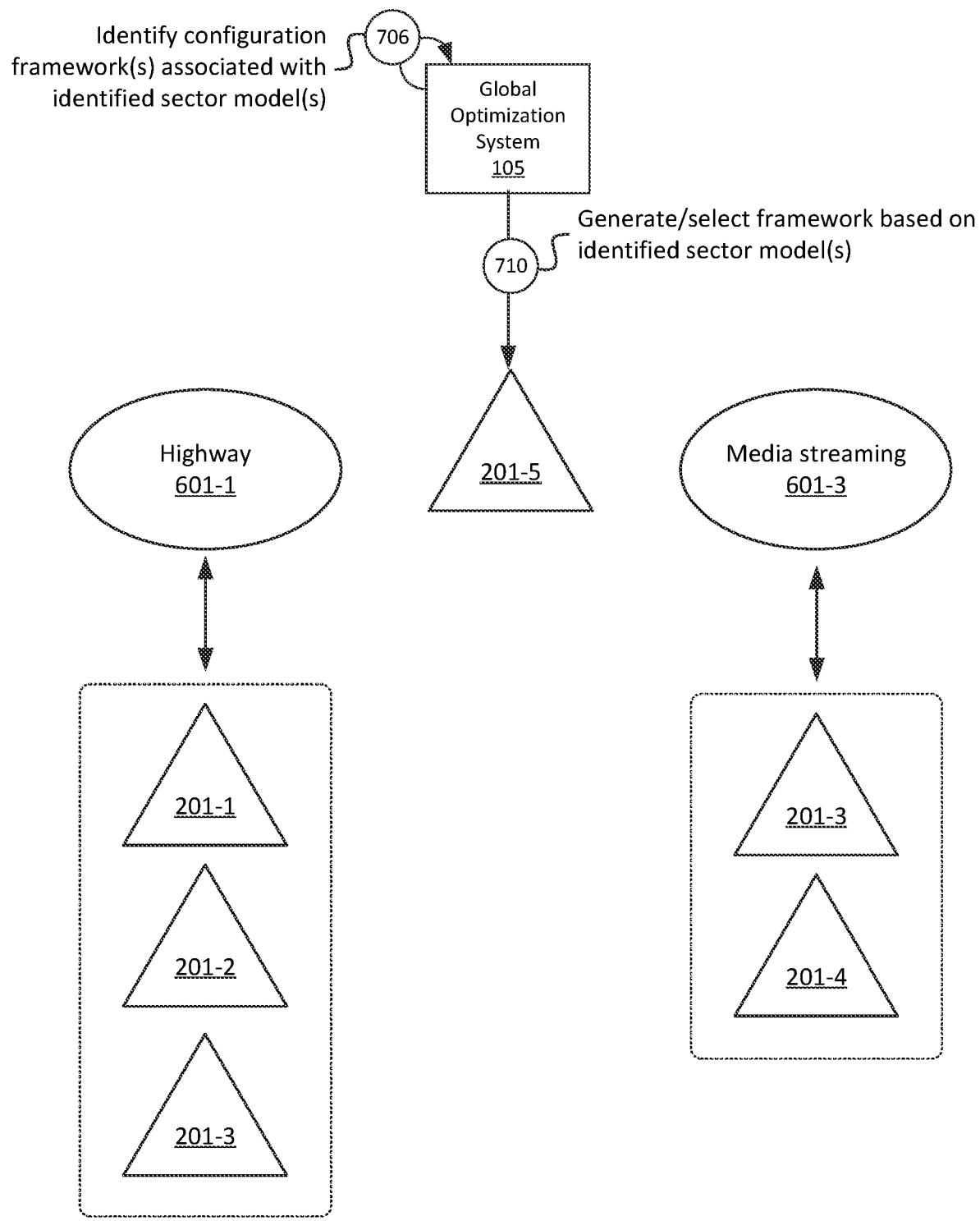
Figure 8:
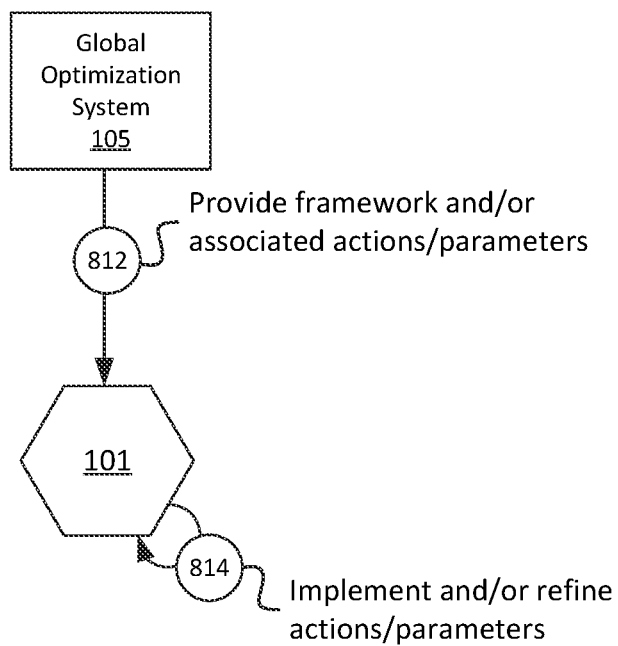

FIGS. 6-8 illustrate an example determination of one or more configuration frameworks 201 and sector models 203 for a particular sector 101, and the performance of one or more actions 205 based on the determined configuration frameworks 201 and/or sector models 203. As shown in FIG. 6, for example, GOS 105 may determine (at 602) parameters and/or attributes of sector 101. As discussed above, such parameters and/or attributes may include QoS metrics 501, energy consumption metrics 503, RAN configuration parameters 505, inter-sector information 507, locale features 509, and/or other suitable parameters, attributes, metrics, or the like. GOS 105 may further identify (at 604) one or more sector models 203 based on the determined parameters and/or attributes of sector 101.

In this example, GOS 105 may determine that sector 101 is associated with a "highway" sector model 601-1 and a "media streaming" sector model 601-3. As further shown, GOS 105 may not determine that sector 101 is associated with an example "office building" sector model 601-2, or an example "dense buildings" sector model 601-4. For example, GOS 105 may determine, based on a suitable similarity analysis of the parameters and/or attributes of sector 101, that sector models 601-2 and 601-4 do not match (e.g., correspond with a measure of similarity above a threshold measure of similarity) sector models 601-2 and 601-4, and/or that sector models 601-1 and 601-3 match (e.g., have a higher measure of similarity with) the parameters and/or attributes of sector 101 more closely. As discussed above, operations 602 and 604 may be performed on an ongoing basis, such that the selection of particular sector models 601 may change based on updated parameters and/or attributes received by GOS 105 over time.

As shown in FIG. 7A, GOS 105 may identify (at 706) one or more configuration frameworks 201 that are associated with identified sector models 601-1 and 601-3. For example, as discussed above, sector models 601-1 and 601-3 may each be associated with one or more configuration frameworks 201. As also discussed above, one or more sector-framework affinity scores 511 between respective configuration frameworks 201 and sector models 601-1 and 601-3 may be used to determine the set of configuration frameworks 201 that are associated with sector models 601-1 and 601-3 (e.g., configuration frameworks 201 with the highest sector-framework affinity scores 511, configuration frameworks 201 with sector-framework affinity scores 511 above a threshold score, etc.). In this example, sector model 601-1 is associated with configuration frameworks 201-1, 201-2, and 201-3, while sector model 601-3 is associated with configuration framework 201-3 and configuration framework 201-4.

GOS 105 may select (at 708) a particular configuration framework 201 based on the identified sets of configuration frameworks 201. In this example, GOS 105 may select (at 708) configuration framework 201-3 based on configuration framework 201-3 being the only respective configuration framework 201 that has been identified with respect to both sector models 601-1 and 601-3. In some embodiments, GOS 105 may select configuration framework 201-3 based on a cumulative, aggregate, etc. sector-framework affinity score 511 associated with each configuration framework 201 with respect to each sector model 601. In this example, configuration framework 201-3 have the highest cumulative, aggregate, etc. sector-framework affinity score 511 based on aggregating sector-framework affinity score 511 between configuration framework 201-3 and sector model 601-1, and between configuration framework 201-3 and sector model 601-3. While particular examples of the selection of configuration framework 201-3 are described above, in practice, GOS 105 may use any suitable selection process or criteria to select configuration framework 201-3 in the example of FIG. 7A.

FIG. 7B illustrates an example generation and/or selection of a particular configuration framework 201 to apply to sector 101. For example, as similarly discussed above with respect to FIG. 7A, GOS 105 may identify (at 706) one or more configuration frameworks 201 that are associated with identified sector models 601-1 and 601-3. In this example, in lieu of selecting one of the identified configuration frameworks 201 (e.g., one of configuration frameworks 201-1 through 201-4), GOS 105 may select or generate a different configuration framework 201-5. For example, GOS 105 may determine that a cumulative, aggregate, average, etc. of one or more of the sector-framework affinity scores 511 associated with the identified (at 706) configuration frameworks 201 does not meet a threshold score. Additionally, or alternatively, GOS 105 may compare sector models 601-1 and 601-3 and determine that a measure of similarity of these sector models 601 does not meet a threshold measure of similarity, and/or that a measure of dissimilarity of these sector models 601 meets a threshold measure of dissimilarity.

In some embodiments, GOS 105 may use one or more AI/ML techniques to select and/or generate configuration framework 201-5. For example, GOS 105 may generate or select configuration framework 201-5 based on identifying features, attributes, etc. of one or more of configuration frameworks 201-1 through 201-4, and identifying common features, attributes, etc. based on which configuration framework 201-5 may be generated or selected. In some embodiments, GOS 105 may additionally, or alternatively, generate and/or select configuration framework 201-5 based on features, attributes, or the like of sector models 601-1 and sector model 601-3.

As shown in FIG. 8, GOS 105 may provide (at 812) the selected configuration framework 201 and/or one or more actions/parameters 205 associated with configuration framework 201, to sector 101. For example, as discussed above, configuration framework 201 may be associated with one or more sets of actions/parameters 205, which may be identified by GOS 105. In some embodiments, sector 101 may instead identify a set of actions/parameters 205 based on the provided configuration framework 201. Sector 101 may further implement (at 814) the received actions and/or parameters. For example, sector 101 may modify antenna parameters (e.g., tilt angle, azimuth angle, etc.), QoS parameters (e.g., queue weights, resource allocation parameters, etc.), and/or other suitable actions and/or parameters as discussed above. Further, sector 101 may continue to "fine tune" the actions and/or parameters based on a continued monitoring of KPIs or other metrics associated with sector 101, such that the actions/parameters 205 associated with sector 101 may be more precisely customized for the exact attributes, KPIs, etc. of sector 101 than configuration framework 201. Additionally, or alternatively, GOS 105 may "fine tune" the actions and/or parameters, and/or modify associations (e.g., affinity scores) between sector 101 and one or more configuration frameworks 201, sector models 203, and/or actions/parameters 205. GOS 105 may also refine associations between configuration frameworks 201, sector models 203, and/or actions/parameters 205 based on the continued monitoring.

While the examples above are provided in the context of configuration framework 201, sector model 203, and actions/parameters 205 being determined for a particular sector 101, in practice, the same or similar operations may be performed (e.g., concurrently, synchronously, asynchronously, sequentially, etc.) with respect to multiple sectors 101. Further, in some embodiments, a particular sector model 203 (and associated configuration frameworks 201 and/or actions/parameters 205) may be determined for an aggregate of multiple sectors (e.g., congruous sectors, adjacent sectors, sectors within a threshold proximity of each other, sectors within a given geographical region, etc.). Such aggregate may be referred to as a "super sector," and/or the constituent sectors 101 may be referred to as "sub-sectors." In such embodiments, a particular sector model 203 for a given super sector may be generated based on an aggregate, average, median, maximum, minimum, or other computed value associated with the KPIs, parameters, etc. of the sub-sectors. In some embodiments, sector model 203 for a given super sector may be based on the sector models 203 associated with respective sub-sectors. For example, sector model 203 for the super sector may be based on selecting one or more sector models 203 of the sub-sectors, and/or selecting or generating a different sector model 203 (e.g., in a manner similar to that described above with respect to FIG. 7B).

In some embodiments, the operations described above may be performed in an iterative and/or prioritized manner. For example, GOS 105 may rank a set of sectors 101 based on overall optimization scores, and may provide actions/parameters to sectors 101 in an order based on the ranking. For example, GOS 105 may select a lowest-scoring sector 101 and may perform operations described above in order to attempt to improve the overall optimization score associated with the lowest-scoring sector 101 (and may continue in this manner in order to address the particular sectors 101 most in need of remedial action).

Figure 9:
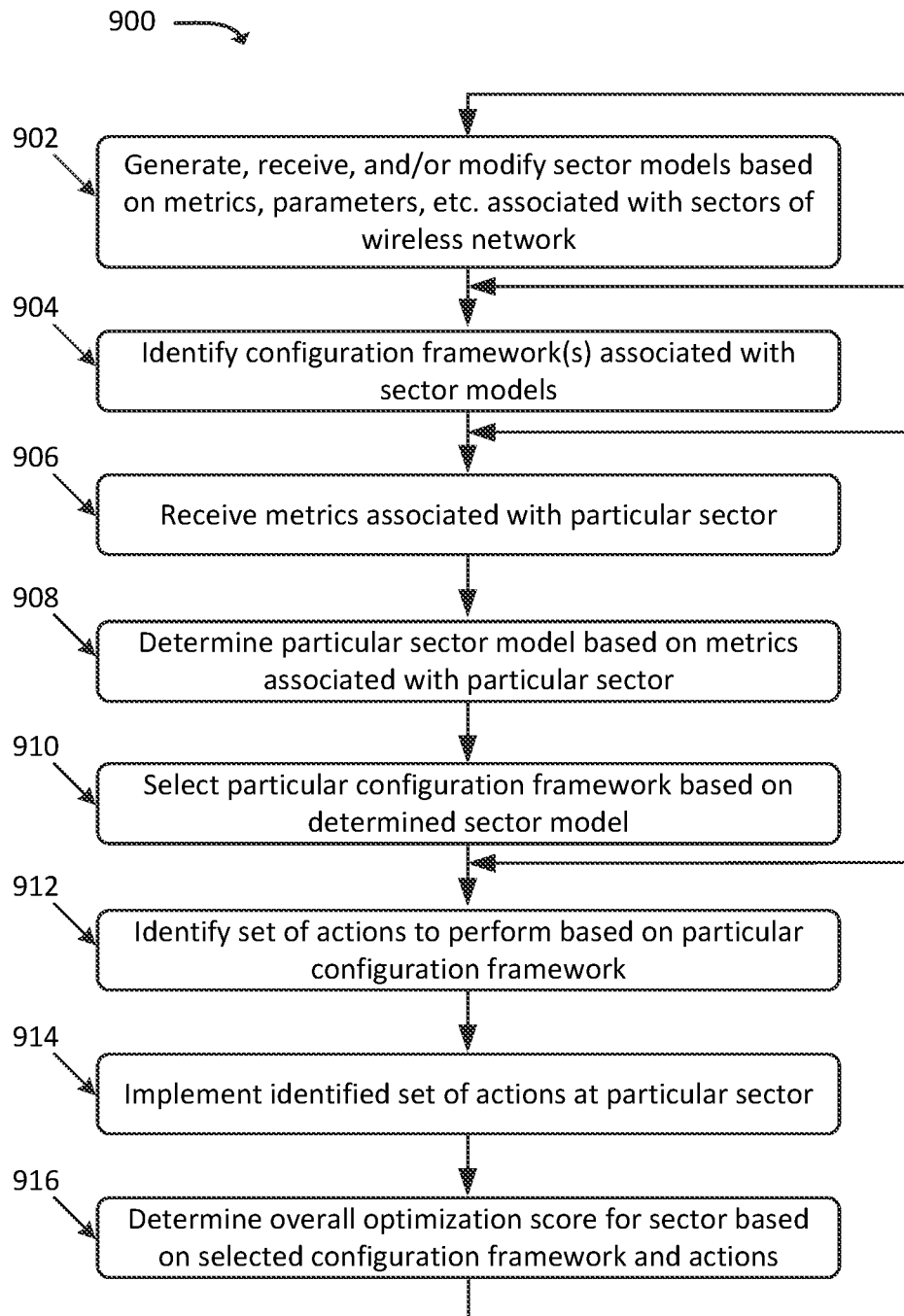
FIG. 9 illustrates an example process for determining one or more sector models, configuration frameworks, and/or sets of actions to perform with respect to a given sector associated with a RAN of a wireless network, in accordance with some embodiments.

FIG. 9 illustrates an example process 900 for determining one or more sector models 203, configuration frameworks 201, and/or sets of actions 205 to perform with respect to a given sector 101. In some embodiments, some or all of process 900 may be performed by GOS 105. In some embodiments, one or more other devices may perform some or all of process 900 in concert with, and/or in lieu of, GOS 105, such as one or more devices or systems associated with one or more sectors 101.

As shown, process 900 may include generating, receiving, and/or modifying (at 902) one or more sector models 203 based on metrics, parameters, etc. associated with one or more sectors 101 of a wireless network. For example, as discussed above, GOS 105 may use AI/ML techniques or other suitable techniques to generate and/or refine sector models 203. For example, GOS 105 may evaluate metrics based on real-word and/or simulated KPIs and/or attributes of one or more sectors 101 in order to generate one or more clusters, classifications, or the like which may be reflected by sector models 203.

Process 900 may further include identifying (at 904) one or more configuration frameworks 201 associated with sector models 203. For example, as discussed above, GOS 105 may identify configuration frameworks 201, which may include weights for particular KPIs, attributes, or the like. The weights may be used when evaluating overall effectiveness, yield, etc. of given sectors 101. For example, as discussed above, the weights may be applied to KPIs associated with sectors 101 in order to generate an overall optimization score associated with sectors 101. In some embodiments, as noted above, GOS 105 may determine one or more affinity scores between particular sector models 203 and configuration frameworks 201, which may indicate the effectiveness, correlation, etc. of a given configuration framework 201 to a given sector model 203.

Process 900 may additionally include receiving (at 906) metrics, KPIs, attributes, or the like associated with a particular sector 101. For example, GOS 105 may receive the metrics, KPIs, attributes, or the like from one or more devices or systems located in sector 101, one or more devices or systems that provide service to UEs located in sector 101, one or more devices or systems associated with a core network to which network infrastructure associated with sector 101 is communicatively coupled, or some other suitable device or system. As discussed above, the metrics, KPIs, attributes, etc., may include, for example, QoS metrics 501, energy consumption metrics 503, RAN configuration parameters 505, inter-sector information 507, locale features 509, and/or other suitable information.

Process 900 may also include determining (at 908) a particular sector model 203 based on the received metrics, KPIs, attributes, etc. For example, as discussed above, GOS 105 may use one or more AI/ML techniques to determine an association, correlation, or the like between the received metrics, KPIs, attributes, etc. and metrics, KPIs, attributes, etc. associated with sector model 203. For example, GOS 105 may select a particular sector model 203 from a set of candidate sector models 203, and/or may generate a new sector model 203 based on the received metrics, KPIs, attributes, etc.

Process 900 may further include selecting (at 910) a particular configuration framework 201 based on the determined sector model 203. For example, as discussed above, GOS 105 may select configuration framework 201 based on respective sector-framework affinity scores 511 between sector model 203 and a set of candidate configuration frameworks 201, and/or may select or generate configuration framework 201 based on sector model 203 (e.g., as similarly discussed above with respect to FIGS. 7A and/or 7B).

Process 900 may additionally include identifying (at 912) a set of actions 205 to perform based on the selected particular configuration framework 201. For example, as discussed above, GOS 105 may select actions/parameters 205 based on respective framework-action affinity scores 513 between configuration framework 201 and a set of candidate actions/parameters 205, and/or may otherwise select or generate actions/parameters 205 based on sector model 203. As noted above, actions/parameters 205 may include QoS actions or parameters, antenna actions or parameters, energy consumption actions or parameters, and/or other suitable actions and/or parameters.

Process 900 may also include implementing (at 914) the identified set of actions. For example, as discussed above, sector 101 may make one or more adjustments to parameters, physical devices (e.g., antennas), or the like based on the identified set of actions/parameters 205.

Process 900 may additionally include determining (at 916) an overall optimization score for sector 101 based on the selected sector model 203 and actions/parameters 205. For example, GOS 105 may determine the overall optimization score based on KPIs received after actions/parameters 205 are implemented (at 914), and further based on weights specified by configuration framework 201. In this manner, GOS 105 may evaluate the effectiveness, accuracy, etc. of the determined configuration framework 201, sector model 203, and/or actions/parameters 205 with respect to sector 101.

As shown in FIG. 9, some or all of process 900 may be performed and/or repeated iteratively. For example, operations 902, 904, 906, and/or 912 may be repeated and/or performed based on the determined (at 916) overall optimization score, which may be updated over time based on real-time and/or near real-time KPIs of sector 101. In this manner, the respective correlations between sector 101, configuration framework 201, sector model 203, and/or actions/parameters 205 may continue to be refined, and sector 101 may be optimized in an automated manner without the need for manual intervention, thereby enhancing the user experience of users receiving service in sector 101.

Further, in some embodiments, some or all of process 900 may be concurrently performed as separate processes on separate devices or systems of a network. For example, GOS 105 may concurrently perform some or all of process 900 at multiple sectors 101. In some embodiments, GOS 105 may perform some or all of process 900 at different levels of hierarchy, which as discussed above may include determining sector models 203 for super sectors, as well as associated configuration frameworks 201 and actions and/or parameters 205. For example, various orchestration, automation, deployment, etc. systems may implement actions and/or parameters 205 at virtualized or containerized instances of network functions. One example of such an orchestration, automation, deployment, etc. is the open-source Kubernetes system. One or more orchestration systems may accordingly adjust parameters associated with a RAN, which may be implemented according to an O-RAN environment (e.g., using a xApp deployment technique, a rApp deployment technique, or some other suitable deployment technique) in some embodiments, as described below.

Accordingly, the analysis and/or adjustment of parameters associated with sectors 101, super sectors, and/or other levels of hierarchy in the network may be performed according to different levels of granularity by, or in concert with, a suitable orchestration system. In some embodiments, for example, GOS 105 may identify a super sector that is exhibiting sub-optimal KPIs, and may further identify a particular sector 101 within the super sector that is exhibiting sup-optimal KPIs (e.g., an overall optimization score below a threshold optimization score). In such a situation, GOS 105 may perform actions and/or modify parameters associated with sector 101, without needing to necessarily perform actions and/or modify parameters associated with other constituent sectors 101 of the super sector. In some embodiments, as also discussed above GOS 105 may perform some or all of process 900 in a prioritized manner, in order to address low-scoring or lowest-scoring sectors 101 (or other delineations of the wireless network) and improve the performance of such sectors 101.

Figure 10:
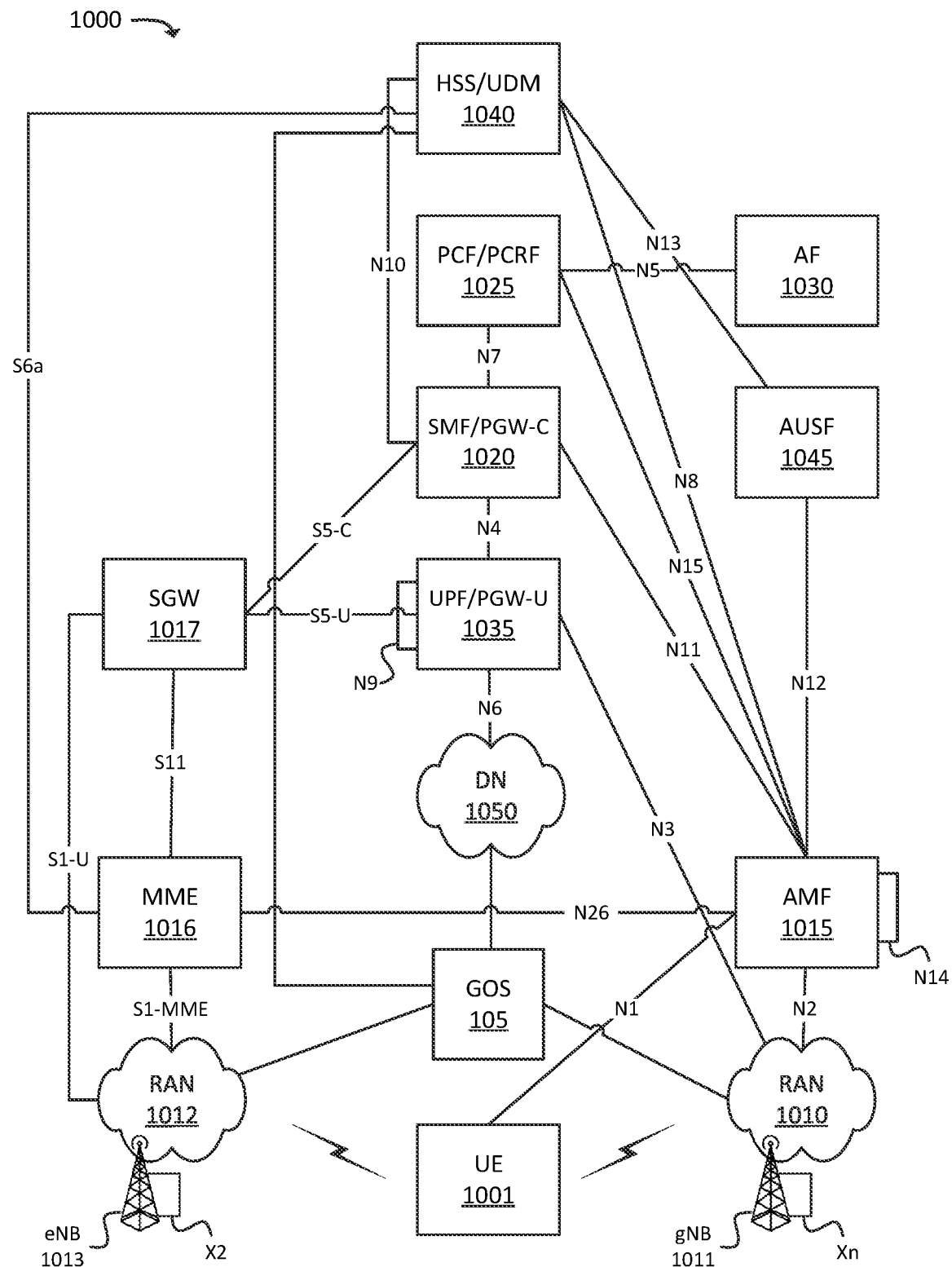
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a 5G network, and/or may include elements of a 5G network. In some embodiments, environment 1000 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 1000 may include UE 1001, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as GOS 105.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1001 may include a computation and communication device, such as a wireless mobile communication device that is capable of communicating with RAN 1010, RAN 1012, and/or DN 1050. UE 1001 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1001 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 1001 may communicate with one or more other elements of environment 1000. UE 1001 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, AMF 1015, and/or one or more other devices or networks) and may communicate the traffic to UE 1001 via the air interface. In some embodiments, sector 101 may be implemented by and/or otherwise associated with one or more gNBs 1011. For example, in some embodiments, base station 103 may be, or may include, gNB 1011.

RAN 1012 may be, or may include, a LTE RAN that includes one or more base stations (e.g., one or more eNBs 1013), via which UE 1001 may communicate with one or more other elements of environment 1000. UE 1001 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, SGW 1017, and/or one or more other devices or networks) and may communicate the traffic to UE 1001 via the air interface. In some embodiments, sector 101 may be implemented by and/or otherwise associated with one or more eNBs 1013. For example, in some embodiments, base station 103 may be, or may include, eNB 1013.

AMF 1015 may include one or more devices, systems, Virtualized Network Functions ("VNFs"), etc., that perform operations to register UE 1001 with the 5G network, to establish bearer channels associated with a session with UE 1001, to hand off UE 1001 from the 5G network to another network, to hand off UE 1001 from the other network to the 5G network, manage mobility of UE 1001 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1001 with the EPC, to establish bearer channels associated with a session with UE 1001, to hand off UE 1001 from the EPC to another network, to hand off UE 1001 from another network to the EPC, manage mobility of UE 1001 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1001. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1001, from DN 1050, and may forward the user plane data toward UE 1001 (e.g., via RAN 1010, SMF/PGW-C 1020, and/or one or more other devices). In some embodiments, multiple UPFs 1035 may be deployed (e.g., in different geographical locations), and the delivery of content to UE 1001 may be coordinated via the N9 interface (e.g., as denoted in FIG. 10 by the line marked "N9" originating and terminating at UPF/PGW-U 1035). Similarly, UPF/PGW-U 1035 may receive traffic from UE 1001 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1001.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1001 may communicate, through DN 1050, with data servers, other UEs 1001, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1001 may communicate.

GOS 105 may include one or more devices, systems, VNFs, or the like that perform one or more operations described above. For example, GOS 105 may generate, receive, refine, etc. one or more models and/or correlations thereof, apply the models to real-world scenarios (e.g., to sectors 101 based on KPIs, parameters, etc. associated with sectors 101), and determine one or more actions to perform based on the determined models for such real-world scenarios. GOS 105 may, as discussed above, receive suitable information from one or more devices or systems associated with sectors 101 (e.g., UE 1001, gNB 1011, eNB 1013, AMF 1015, MME 1016, HSS/UDM 1040, a SCEF, a NEF, and/or one or more other suitable devices or systems).

Figure 11:
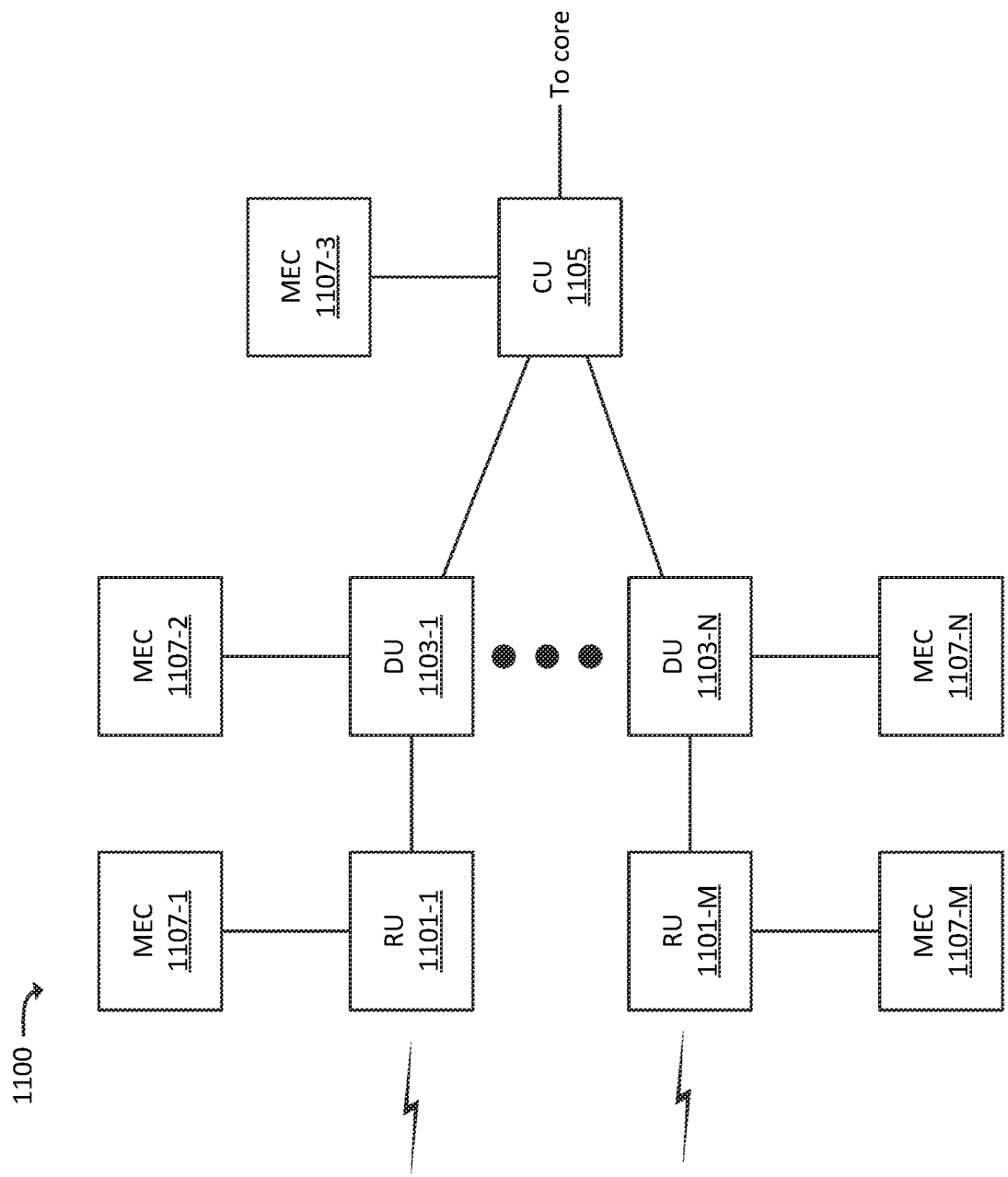
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 1001 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1001, and may determine which DU(s) 1103 should receive the downlink traffic. DU 1103 may include one or more devices that transmit traffic between a core network (e.g., via CU 1105) and UE 1001 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1001.

RU 1101 may include hardware circuitry (e.g., one or more RF transceivers, antennas, radios, and/or other suitable hardware) to communicate wirelessly (e.g., via an RF interface) with one or more UEs 1001, one or more other DUs 1103 (e.g., via RUs 1101 associated with DUs 1103), and/or any other suitable type of device. In the uplink direction, RU 1101 may receive traffic from UE 1001 and/or another DU 1103 via the RF interface and may provide the traffic to DU 1103. In the downlink direction, RU 1101 may receive traffic from DU 1103, and may provide the traffic to UE 1001 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1001, via a respective RU 1101.

For example, RU 1101-1 may route some traffic, from UE 1001, to MEC 1107-1 instead of to a core network (e.g., via DU 1103 and CU 1105). MEC 1107-1 may process the traffic, perform one or more computations based on the received traffic, and may provide traffic to UE 1001 via RU 1101-1. In this manner, ultra-low latency services may be provided to UE 1001, as traffic does not need to traverse DU 1103, CU 1105, and an intervening backhaul network between DU network 1100 and the core network. In some embodiments, MEC 1107 may include, and/or may implement, some or all of the functionality described above with respect to GOS 105.

Figure 12:
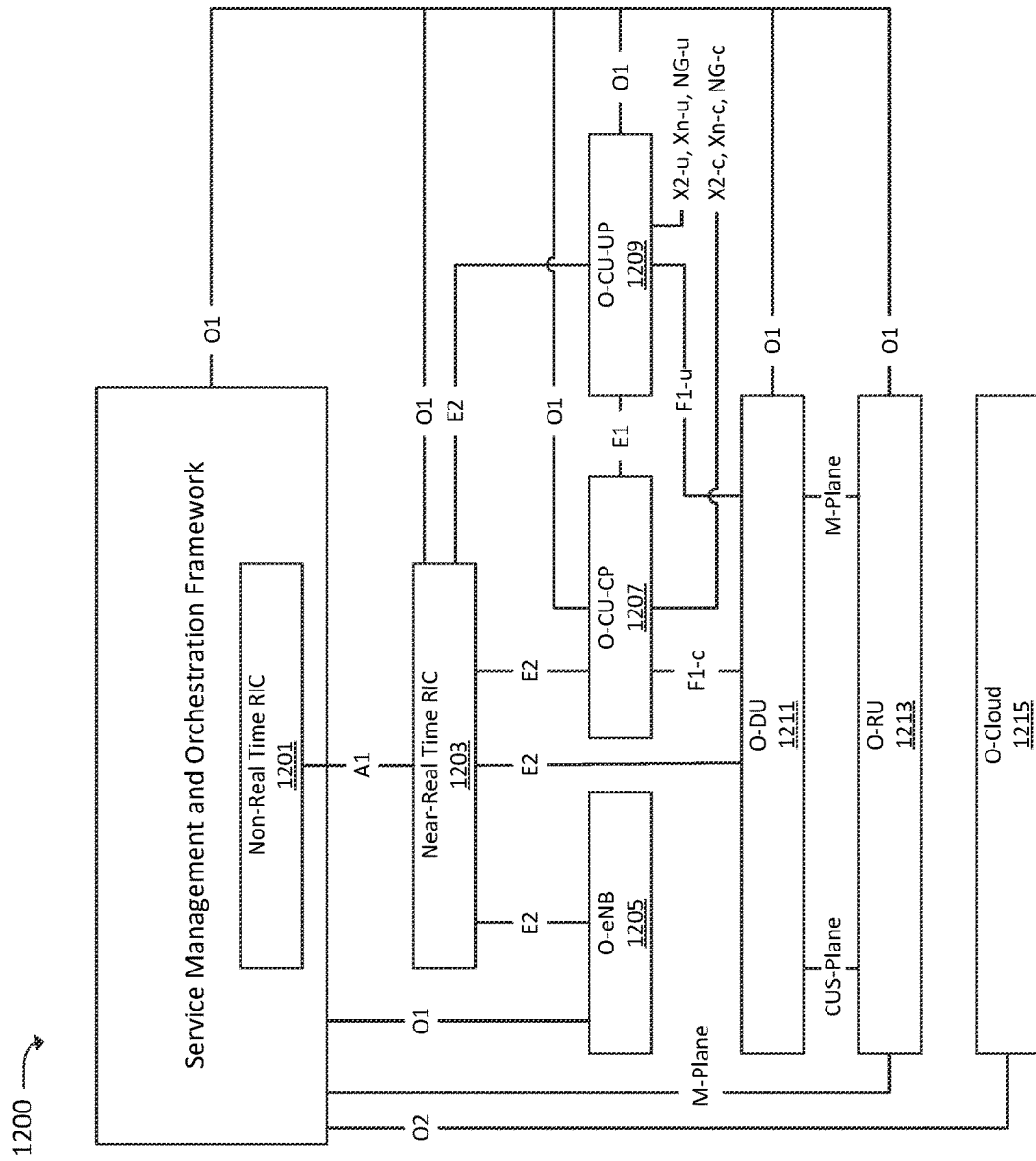
FIG. 12 illustrates an example arrangement of an Open RAN ("O-RAN") environment in which one or more embodiments, described herein, may be implemented.

FIG. 12 illustrates an example O-RAN environment 1200, which may correspond to RAN 1010, RAN 1012, and/or DU network 1100. For example, RAN 1010, RAN 1012, and/or DU network 1100 may include one or more instances of O-RAN environment 1200, and/or one or more instances of O-RAN environment 1200 may implement RAN 1010, RAN 1012, DU network 1100, and/or some portion thereof. As shown, O-RAN environment 1200 may include Non-Real Time Radio Intelligent Controller ("RIC") 1201, Near-Real Time RIC 1203, O-eNB 1205, O-CU-Control Plane ("O-CU-CP") 1207, O-CU-User Plane ("O-CU-UP") 1209, O-DU 1211, O-RU 1213, and O-Cloud 1215. In some embodiments, O-RAN environment 1200 may include additional, fewer, different, and/or differently arranged components.

In some embodiments, some or all of the elements of O-RAN environment 1200 may be implemented by one or more configurable or provisionable resources, such as virtual machines, cloud computing systems, physical servers, and/or other types of configurable or provisionable resources. In some embodiments, some or all of O-RAN environment 1200 may be implemented by, and/or communicatively coupled to, one or more MECs 1107.

Non-Real Time RIC 1201 and Near-Real Time RIC 1203 may receive performance information (and/or other types of information) from one or more sources, and may configure other elements of O-RAN environment 1200 based on such performance or other information. For example, Near-Real Time RIC 1203 may receive performance information, via one or more E2 interfaces, from O-eNB 1205, O-CU-CP 1207, and/or O-CU-UP 1209, and may modify parameters associated with O-eNB 1205, O-CU-CP 1207, and/or O-CU-UP 1209 based on such performance information. Similarly, Non-Real Time RIC 1201 may receive performance information associated with O-eNB 1205, O-CU-CP 1207, O-CU-UP 1209, and/or one or more other elements of O-RAN environment 1200 and may utilize machine learning and/or other higher level computing or processing to determine modifications to the configuration of O-eNB 1205, O-CU-CP 1207, O-CU-UP 1209, and/or other elements of O-RAN environment 1200. In some embodiments, Non-Real Time MC 1201 may generate machine learning models based on performance information associated with O-RAN environment 1200 or other sources, and may provide such models to Near-Real Time MC 1203 for implementation.

O-eNB 1205 may perform functions similar to those described above with respect to eNB 1013. For example, O-eNB 1205 may facilitate wireless communications between UE 1001 and a core network. O-CU-CP 1207 may perform control plane signaling to coordinate the aggregation and/or distribution of traffic via one or more DUs 1103, which may include and/or be implemented by one or more O-DUs 1211, and O-CU-UP 1209 may perform the aggregation and/or distribution of traffic via such DUs 1103 (e.g., O-DUs 1211). O-DU 1211 may be communicatively coupled to one or more RUs 1101, which may include and/or may be implemented by one or more O-RUs 1213. In some embodiments, O-Cloud 1215 may include or be implemented by one or more MECs 1107, which may provide services, and may be communicatively coupled, to O-CU-CP 1207, O-CU-UP 1209, O-DU 1211, and/or O-RU 1213 (e.g., via an O1 and/or O2 interface).

Figure 13:
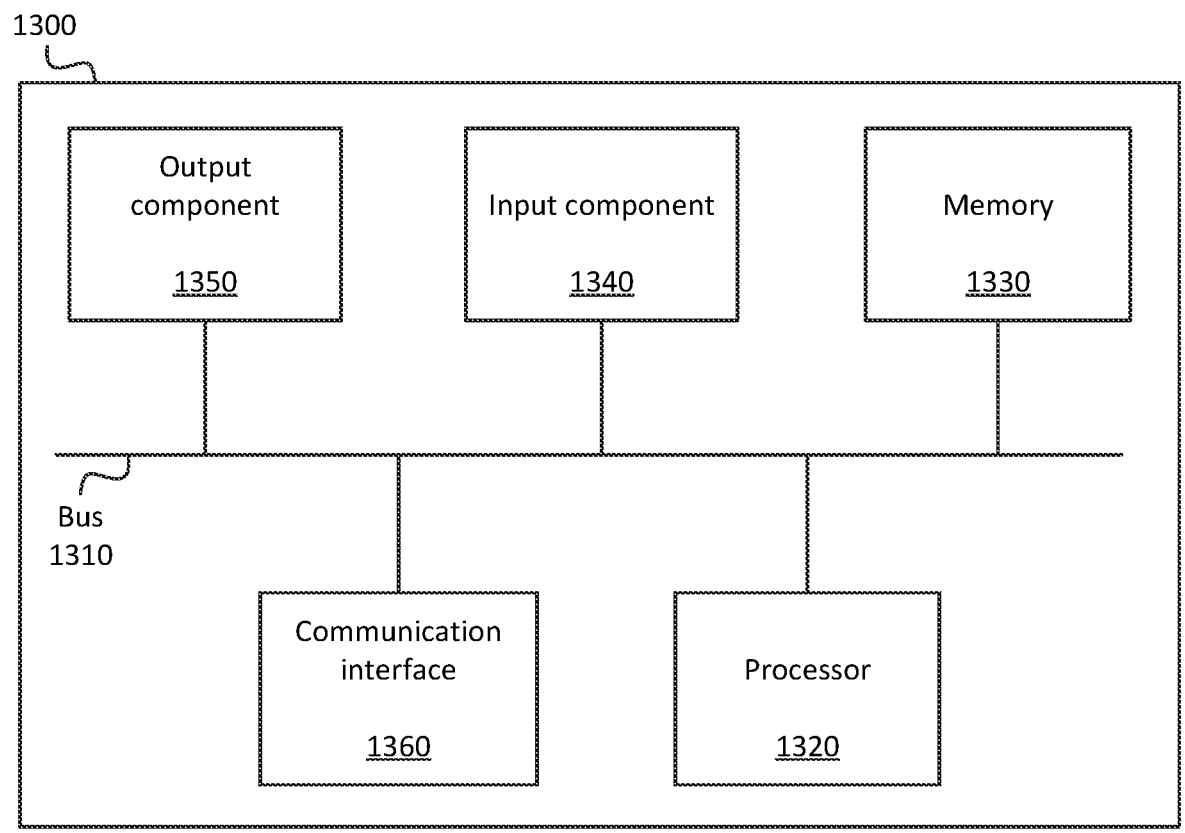
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   generate a plurality of sector models, wherein a first sector model, of the plurality of sector models, is associated with a first set of metrics associated with at least a first time period;
   generate a plurality of configuration frameworks associated with each respective sector model, of the plurality of sector models, wherein each configuration framework specifies a plurality of metrics and a weight associated with each metric of the plurality of metrics;
   receive, over a second time period, metrics associated with a radio access network ("RAN") having wireless network infrastructure that provides wireless service within a particular sector, wherein the particular sector is associated with a first portion of a geographic area that includes a plurality of sectors;

determine, based on the metrics received over the second time period, a particular sector model, of the plurality of sector models, that is associated with the particular sector;
select a particular configuration framework based on the determined particular sector model associated with the particular sector;
identify a set of actions to perform based on the particular configuration framework; and
implement the set of actions, associated with the particular configuration framework, at the wireless network infrastructure of the particular sector.

2. The device of claim 1, wherein the one or more processors are further configured to:
determine a plurality of sets of affinity scores between the plurality of configuration frameworks and a plurality of sets of actions, wherein a particular set of affinity scores is associated with:
the particular configuration framework, and
the plurality of sets of actions,
wherein each respective affinity score of the particular set of affinity scores is associated with the particular configuration framework and a respective action of the plurality of sets of actions.

3. The device of claim 2, wherein identifying the set of actions based on the particular configuration framework includes:
determining that the respective affinity score associated with the identified set of actions and the particular configuration framework is a highest affinity score of the particular set of affinity scores.

4. The device of claim 1, wherein the one or more processors are further configured to:
determine an overall optimization score associated with the particular sector based on:
the metrics, associated with the particular sector, received over the second time period, and
the plurality of weights associated with the particular configuration framework.

5. The device of claim 4, wherein the one or more processors are further configured to:
rank the particular sector against one or more other sectors based on respective overall optimization scores associated with the particular sector and the one or more other sectors.

6. The device of claim 5, wherein the one or more processors are further configured to:
determine, based on the ranking, that the particular sector is associated with a lowest overall optimization score of the respective overall optimization scores,
wherein the identifying and implementing of the actions with respect to the particular sector are based on the determination that that the particular sector is associated with the lowest overall optimization score of the respective overall optimization scores.

7. The device of claim 1, wherein the network infrastructure includes one or more antennas, and wherein the set of actions includes at least one of:
modifying a tilt angle of the one or more antennas,
modifying an azimuth angle of the one or more antennas,
modifying a beam width of radio frequency ("RF") communications associated with the one or more antennas, or
modifying a transmission power of RF communications associated with the one or more antennas.

8. A non-transitory computer-readable medium, storing a plurality of processor-executable instructions to:

generate a plurality of sector models, wherein a first sector model, of the plurality of sector models, is associated with a first set of metrics associated with at least a first time period;
generate a plurality of configuration frameworks associated with each respective sector model, of the plurality of sector models, wherein each configuration framework specifies a plurality of metrics and a weight associated with each metric of the plurality of metrics;
receive, over a second time period, metrics associated with a radio access network ("RAN") having wireless network infrastructure that provides wireless service within a particular sector, wherein the particular sector is associated with a first portion of a geographic area that includes a plurality of sectors;
determine, based on the metrics received over the second time period, a particular sector model, of the plurality of sector models, that is associated with the particular sector;
select a particular configuration framework based on the determined particular sector model associated with the particular sector;
identify a set of actions to perform based on the particular configuration framework; and
implement the set of actions, associated with the particular configuration framework, at the wireless network infrastructure of the particular sector.

9. The non-transitory computer-readable medium of claim 8, wherein the plurality of processor-executable instructions further include processor-executable instructions to:
determine a plurality of sets of affinity scores between the plurality of configuration frameworks and a plurality of sets of actions, wherein a particular set of affinity scores is associated with:
the particular configuration framework, and
the plurality of sets of actions,
wherein each respective affinity score of the particular set of affinity scores is associated with the particular configuration framework and a respective action of the plurality of sets of actions.

10. The non-transitory computer-readable medium of claim 9, wherein identifying the set of actions based on the particular configuration framework includes:
determining that the respective affinity score associated with the identified set of actions and the particular configuration framework is a highest affinity score of the particular set of affinity scores.

11. The non-transitory computer-readable medium of claim 8, wherein the plurality of processor-executable instructions further include processor-executable instructions to:
determine an overall optimization score associated with the particular sector based on:
the metrics, associated with the particular sector, received over the second time period, and
the plurality of weights associated with the particular configuration framework.

12. The non-transitory computer-readable medium of claim 11, wherein the plurality of processor-executable instructions further include processor-executable instructions to:
rank the particular sector against one or more other sectors based on respective overall optimization scores associated with the particular sector and the one or more other sectors.

13. The non-transitory computer-readable medium of claim 12, wherein the plurality of processor-executable instructions further include processor-executable instructions to:
  determine, based on the ranking, that the particular sector is associated with a lowest overall optimization score of the respective overall optimization scores,
  wherein the identifying and implementing of the actions with respect to the particular sector are based on the determination that that the particular sector is associated with the lowest overall optimization score of the respective overall optimization scores.

14. The non-transitory computer-readable medium of claim 8, wherein the network infrastructure includes one or more antennas, and wherein the set of actions includes at least one of:
  modifying a tilt angle of the one or more antennas,
  modifying an azimuth angle of the one or more antennas,
  modifying a beam width of radio frequency ("RF") communications associated with the one or more antennas, or
  modifying a transmission power of RF communications associated with the one or more antennas.

15. A method, comprising:
  generating a plurality of sector models, wherein a first sector model, of the plurality of sector models, is associated with a first set of metrics associated with at least a first time period;
  generating a plurality of configuration frameworks associated with each respective sector model, of the plurality of sector models, wherein each configuration framework specifies a plurality of metrics and a weight associated with each metric of the plurality of metrics;
  receiving, over a second time period, metrics associated with a radio access network ("RAN") having wireless network infrastructure that provides wireless service within a particular sector, wherein the particular sector is associated with a first portion of a geographic area that includes a plurality of sectors;
  determining, based on the metrics received over the second time period, a particular sector model, of the plurality of sector models, that is associated with the particular sector;
  selecting a particular configuration framework based on the determined particular sector model associated with the particular sector;
  identifying a set of actions to perform based on the particular configuration framework; and
  implementing the set of actions, associated with the particular configuration framework, at the wireless network infrastructure of the particular sector.

16. The method of claim 15, the method further comprising:
  determining a plurality of sets of affinity scores between the plurality of configuration frameworks and a plurality of sets of actions, wherein a particular set of affinity scores is associated with:
  the particular configuration framework, and
  the plurality of sets of actions,
    wherein each respective affinity score of the particular set of affinity scores is associated with the particular configuration framework and a respective action of the plurality of sets of actions,
    wherein identifying the set of actions based on the particular configuration framework includes determining that the respective affinity score associated with the identified set of actions and the particular configuration framework is a highest affinity score of the particular set of affinity scores.

17. The method of claim 15, the method further comprising:
  determining an overall optimization score associated with the particular sector based on:
    the metrics, associated with the particular sector, received over the second time period, and
    the plurality of weights associated with the particular configuration framework.

18. The method of claim 17, the method further comprising:
  ranking the particular sector against one or more other sectors based on respective overall optimization scores associated with the particular sector and the one or more other sectors.

19. The method of claim 18, the method further comprising:
  determining, based on the ranking, that the particular sector is associated with a lowest overall optimization score of the respective overall optimization scores,
  wherein the identifying and implementing of the actions with respect to the particular sector are based on the determination that that the particular sector is associated with the lowest overall optimization score of the respective overall optimization scores.

20. The method of claim 15, wherein the network infrastructure includes one or more antennas, and wherein the set of actions includes at least one of:
  modifying a tilt angle of the one or more antennas,
  modifying an azimuth angle of the one or more antennas,
  modifying a beam width of radio frequency ("RF") communications associated with the one or more antennas, or
  modifying a transmission power of RF communications associated with the one or more antennas.

* * * * *